(12) United States Patent
Umemoto

(10) Patent No.: US 11,060,018 B2
(45) Date of Patent: Jul. 13, 2021

(54) REVERSIBLY THERMOCHROMIC COMPOSITION AND REVERSIBLY THERMOCHROMIC MICROCAPSULE PIGMENT ENCAPSULATING THE SAME

(71) Applicant: THE PILOT INK CO., LTD., Aichi-ken (JP)

(72) Inventor: Hiroshi Umemoto, Aichi-ken (JP)

(73) Assignee: THE PILOT INK CO., LTD., Aichi-Ken (JP)

( * ) Notice: Subject to any disclaimer, the term of this patent is extended or adjusted under 35 U.S.C. 154(b) by 106 days.

(21) Appl. No.: 16/603,331

(22) PCT Filed: Apr. 6, 2018

(86) PCT No.: PCT/JP2018/014658
§ 371 (c)(1),
(2) Date: Oct. 7, 2019

(87) PCT Pub. No.: WO2018/186479
PCT Pub. Date: Oct. 11, 2018

(65) Prior Publication Data
US 2020/0048542 A1    Feb. 13, 2020

(30) Foreign Application Priority Data

Apr. 7, 2017 (JP) .............................. JP2017-076378
Apr. 10, 2017 (JP) .............................. JP2017-077270

(51) Int. Cl.
| | | |
|---|---|---|
| *C09K 9/02* | (2006.01) | |
| *B41M 5/30* | (2006.01) | |
| *C09D 11/037* | (2014.01) | |
| *C09D 11/50* | (2014.01) | |
| *C08K 5/13* | (2006.01) | |
| *C08K 5/136* | (2006.01) | |
| *C08K 5/3432* | (2006.01) | |
| *C08K 9/10* | (2006.01) | |

(52) U.S. Cl.
CPC .................. *C09K 9/02* (2013.01); *B41M 5/30* (2013.01); *C09D 11/037* (2013.01); *C09D 11/50* (2013.01); *C08K 5/13* (2013.01); *C08K 5/136* (2013.01); *C08K 5/3432* (2013.01); *C08K 9/10* (2013.01); *C09K 2211/1007* (2013.01); *C09K 2211/1018* (2013.01)

(58) Field of Classification Search
CPC ........ C09K 9/02; C09D 11/037; C09D 11/50; B41M 5/30; C08L 101/00
See application file for complete search history.

(56) References Cited

U.S. PATENT DOCUMENTS

| | | | |
|---|---|---|---|
| 5,558,700 A | 9/1996 | Shibahashi et al. | |
| 2002/0008465 A1 | 1/2002 | Ueno et al. | |
| 2013/0075675 A1 | 3/2013 | Krutak et al. | |

FOREIGN PATENT DOCUMENTS

| | | |
|---|---|---|
| JP | 7-186540 | 7/1995 |
| JP | 8-127768 | 5/1996 |
| JP | 2000-129252 | 5/2000 |
| JP | 2000-169448 | 6/2000 |
| JP | 2001-342193 | 12/2001 |
| JP | 2012-46556 | 3/2012 |
| WO | 2013/049229 | 4/2013 |

OTHER PUBLICATIONS

JP 2012-046556 machine translation (Year: 2012).*
International Preliminary Report on Patentability dated Oct. 17, 2019 in corresponding International Patent Application No. PCT/JP2018/014658.
International Search Report dated May 1, 2018 in International Application No. PCT/JP2018/014658.
Extended European Search Report dated Nov. 2, 2020 in corresponding European Patent Application No. 18781028.8.

* cited by examiner

*Primary Examiner* — Edward J Cain
(74) *Attorney, Agent, or Firm* — Wenderoth, Lind & Ponack, L.L.P.

(57) ABSTRACT

[Problems] The present invention provides a highly marketable reversibly color changeable composition which provides a vivid yellow to orange color during color development, turns colorless during decoloration, and improves light resistance and a reversibly thermochromic microcapsule pigment encapsulating the same.
[Solution] Disclosed are a reversibly thermochromic composition including: (a) a specific pyridine derivative as an electron-donating color-developing organic compound; (b) an electron-accepting compound; and (c) a reaction medium which reversibly induces an electron transfer reaction between the component (a) and the component (b) in a specific temperature range, and a reversibly thermochromic microcapsule pigment encapsulating the same.

11 Claims, 2 Drawing Sheets

[FIG. 1]
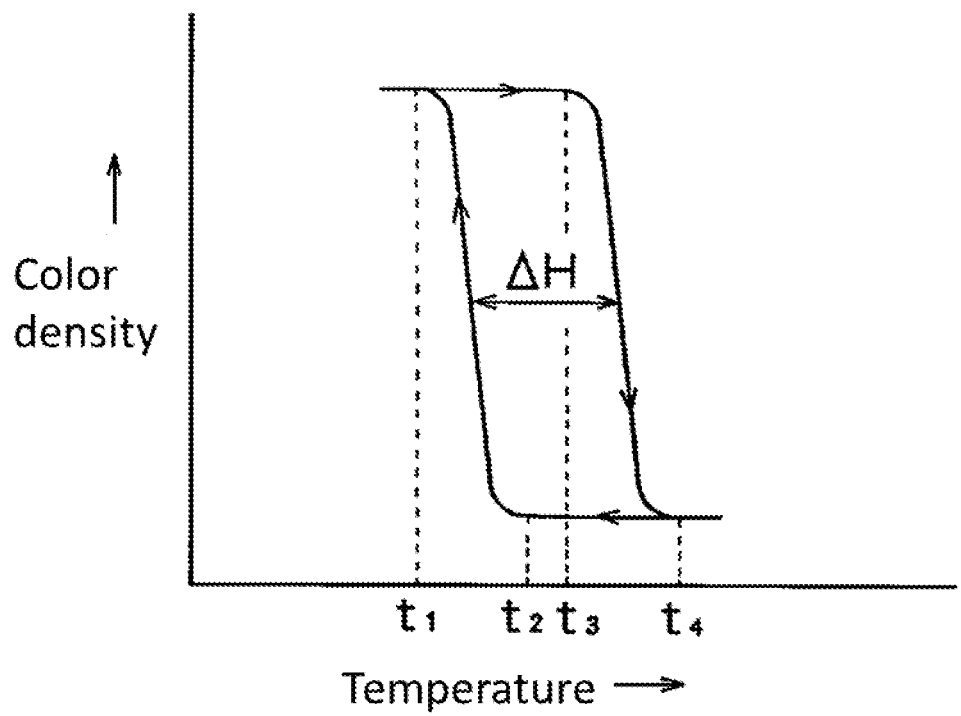
[FIG. 2]
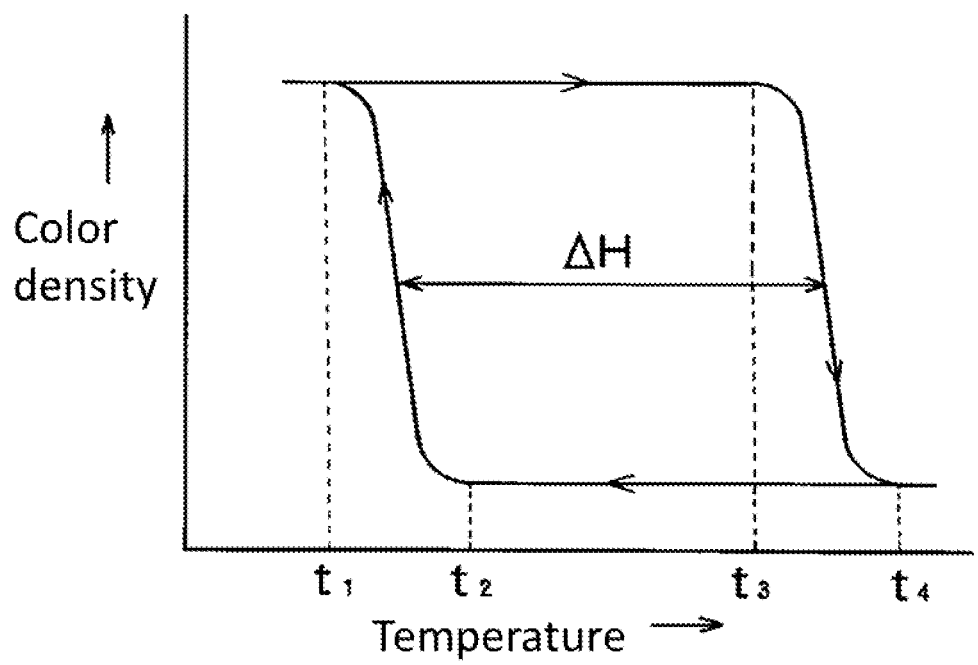

[FIG. 3]
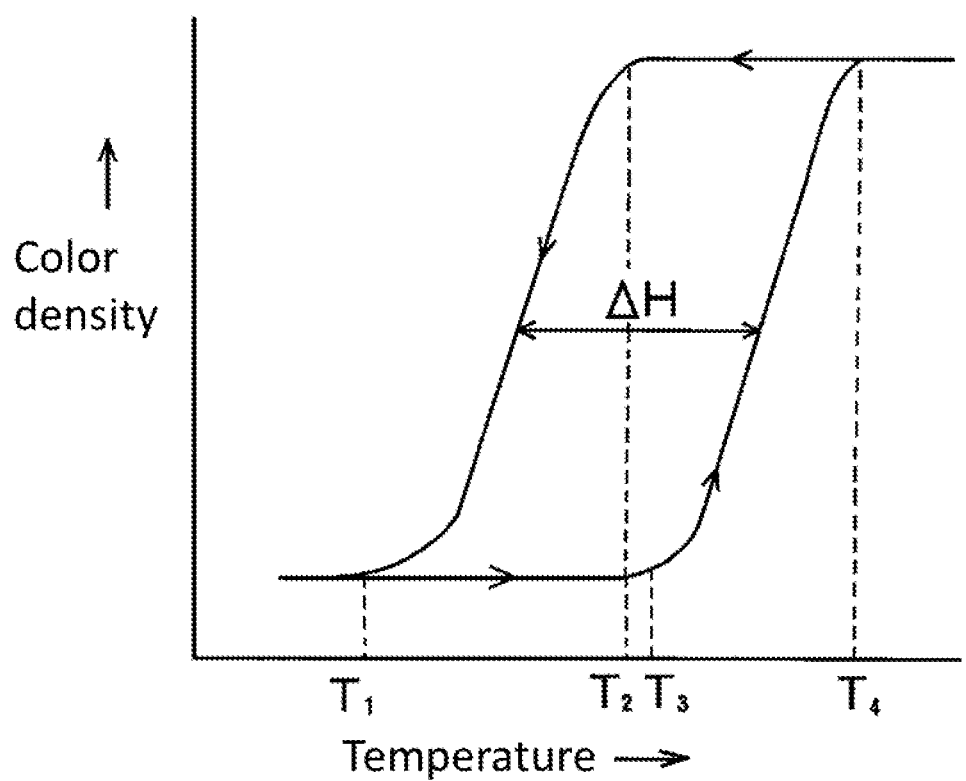

REVERSIBLY THERMOCHROMIC COMPOSITION AND REVERSIBLY THERMOCHROMIC MICROCAPSULE PIGMENT ENCAPSULATING THE SAME

TECHNICAL FIELD

The present invention relates to a reversibly thermochromic composition and a reversibly thermochromic microcapsule pigment encapsulating the same. More particularly, the present invention relates to: a reversibly thermochromic composition which provides a yellow to orange color during color development and turns colorless during decoloration, and a reversibly thermochromic microcapsule pigment encapsulating the same.

BACKGROUND ART

With respect to a reversibly thermochromic composition containing, as essential components, an electron-donating color-developing organic compound, an electron-accepting compound, and a reaction medium which reversibly induces an electron transfer reaction between the electron-donating color-developing organic compound and the electron-accepting compound in a specific temperature range and showing a discoloration from yellow to orange to colorless, several proposals have been hitherto disclosed (see, for example, Patent Literature 1 to 3).

The above-mentioned conventional reversibly thermochromic composition is formed using a pyridine compound as an electron-donating color-developing organic compound capable of providing yellow to orange color, has fluorescence, and provides vivid color. However, this type of reversibly thermochromic composition is poor in light resistance, and the color density may be reduced particularly when the reversibly thermochromic composition is exposed to light during color development.

CITATION LIST

Patent Literature

Patent Literature 1: JP H7-186540 A
Patent Literature 2: JP H8-127768 A
Patent Literature 3: JP 2012-46556 A

SUMMARY OF INVENTION

Technical Problem

The present invention solves the above-mentioned conventional problems, and provides a reversibly thermochromic composition, which provides a vivid yellow to orange color in a colored state, turns colorless in a decolored state, is excellent in light resistance, and can retain contrast between color during color development and color during decoloration, and a reversibly thermochromic microcapsule pigment encapsulating the same.

Solution to Problem

The present invention relates to a reversibly thermochromic composition including: (a) a pyridine derivative represented by the following formula (A), as an electron-donating color-developing organic compound; (b) an electron-accepting compound; and (c) a reaction medium which reversibly induces an electron transfer reaction between the component (a) and the component (b) in a specific temperature range:

[Chem. 1]

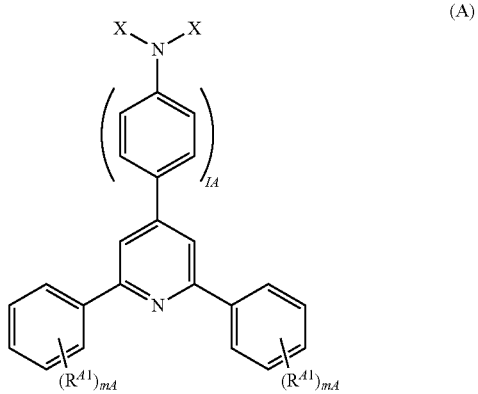

(A)

(wherein, each $R^{A1}$ is independently hydrogen, a halogen group, or a linear or branched alkoxy group having 1 to 6 carbon atoms, provided that at least one of $R^{A1}$ is an alkoxy group, each mA is independently an integer of 1 to 3, lA is an integer of 1 or 2, and X is hydrogen or a group represented by the following formula:

[Chem. 2]

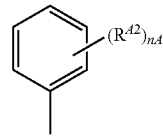

wherein, each $R^{A2}$ is independently hydrogen, a linear or branched alkyl group having 1 to 6 carbon atoms, or a linear or branched alkoxy group having 1 to 6 carbon atoms, and each nA is independently an integer of 1 to 3, provided that two X never simultaneously form hydrogen and never simultaneously form a phenyl group).

The present invention also relates to a reversibly thermochromic microcapsule pigment encapsulating the reversibly thermochromic composition.

The present invention also relates to a reversibly thermochromic liquid composition including the reversibly thermochromic microcapsule pigment and a vehicle.

The present invention also relates to a resin composition for forming a reversibly thermochromic molded article including the reversibly thermochromic microcapsule pigment, and a thermoplastic resin, a thermosetting resin, or wax.

The present invention also relates to a laminate comprising a reversibly thermochromic layer including the above-mentioned reversibly thermochromic composition on a support.

Advantageous Effects of Invention

The present invention can provide a highly marketable reversibly color changeable composition which provides a vivid yellow to orange color during color development by using a specific pyridine derivative as an electron-donating color-developing organic compound, turns colorless during decoloration, and improves light resistance during color development in particular and a reversibly thermochromic microcapsule pigment encapsulating the same.

BRIEF DESCRIPTION OF DRAWINGS

FIG. 1 is a graph for explaining a hysteresis characteristic of a reversibly thermochromic composition of heat-decoloring type in a color density-temperature curve.

FIG. 2 is a graph for explaining the hysteresis characteristic of the reversibly thermochromic composition of heat-decoloring type having a color-memory property in the color density-temperature curve.

FIG. 3 is a graph for explaining the hysteresis characteristic of a reversibly thermochromic composition of heat color-developing type in the color density-temperature curve.

DESCRIPTION OF EMBODIMENTS

Examples of reversibly thermochromic compositions include a reversibly thermochromic composition of heat-decoloring type (decolored when heated, and colored when cooled) including at least three essential components: (a) an electron-donating color-developing organic compound; (b) an electron-accepting compound; and (c) a reaction medium to determine an occurrence temperature of a coloring reaction of the two.

The reversibly thermochromic composition changes color above and below a predetermined temperature (color changing point), exhibits a decolored state in a temperature range not lower than an upper color changing point, exhibits a colored state in a temperature range not higher than a lower color changing point, and has hysteresis characteristics in which only one specific state, of the both states, exists in a normal temperature range, and the other state is maintained only while heat or cold required for the other state to be expressed is being applied, but the state in the normal temperature range is restored once the application of heat or cold is terminated. FIG. 1 shows the hysteresis characteristics in which a hysteresis width ($\Delta H$) is relatively small (see FIG. 1).

It is possible to apply a reversibly thermochromic composition of heat-decoloring type (decolored when heated, and colored when cooled) in which the hysteresis width is relative large, that is, which changes the color along very different paths in the curve of plots showing color density change with temperature change between when the temperature increases from a region lower than the discoloration range and when the temperature decreases from a region higher than the discoloration range (see FIG. 2). Consequently, the reversibly thermochromic composition has color memorability in the specific temperature range (range between $t_2$ and $t_3$ [essentially two-phase retaining temperature range]), in which the color state depends on the color-developed state in a range lower than the completely coloring temperature ($t_1$) or on the decolored state in a range higher than the completely decoloring temperature ($t_4$).

The respective components (a), (b), and (c) will be specifically explained below.

The component (a) used in the present invention is a pyridine derivative represented by the following formula (A):

[Chem. 3]

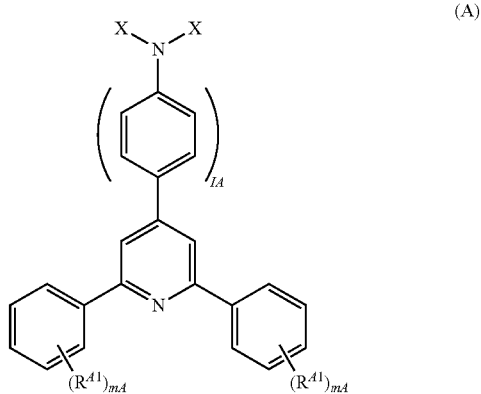

wherein, each $R^{41}$ is independently hydrogen, a halogen group, or a linear or branched alkoxy group having 1 to 6 carbon atoms, provided that at least one of $R^{41}$ is an alkoxy group, each mA is independently an integer of 1 to 3, lA is an integer of 1 or 2 and X is hydrogen or a group represented by the following formula:

[Chem. 4]

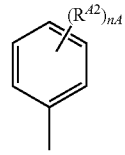

wherein, each $R^{42}$ is independently hydrogen, a linear or branched alkyl group having 1 to 6 carbon atoms, or a linear or branched alkoxy group having 1 to 6 carbon atoms, and each nA is independently an integer of 1 to 3, provided that two X never simultaneously form hydrogen and never simultaneously form a phenyl group.

In the present invention, the component (a) is preferably a pyridine derivative represented by the following formula (1) or (2):

[Chem. 5]

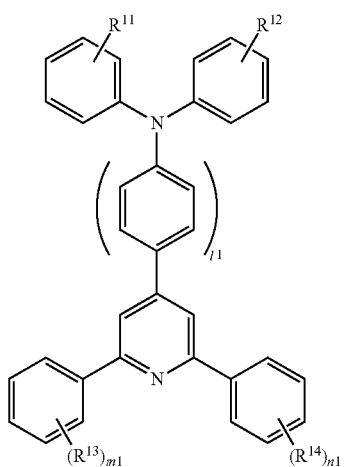

(1)

wherein $R^{11}$ is a linear or branched alkyl group having 1 to 6 carbon atoms, or a linear or branched alkoxy group having 1 to 6 carbon atoms, $R^{12}$ is hydrogen, a linear or branched alkyl group having 1 to 6 carbon atoms, or a linear or branched alkoxy group having 1 to 6 carbon atoms, each $R^{13}$ is independently a halogen group or a linear or branched alkoxy group having 1 to 6 carbon atoms, provided that at least one of $R^{13}$ is an alkoxy group, each $R^{14}$ is independently hydrogen, a halogen group, or a linear or branched alkoxy group having 1 to 6 carbon atoms, l1 is an integer of 1 or 2, and m1 and n1 each independently represents an integer of 1 to 3.

[Chem. 6]

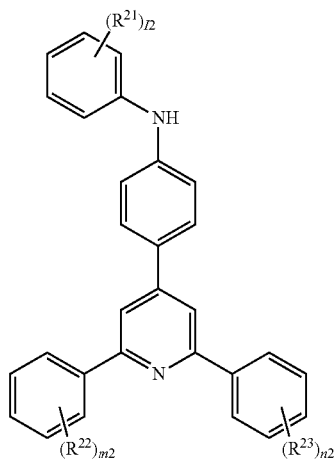

(2)

wherein each $R^{21}$ is independently a linear or branched alkyl group having 1 to 6 carbon atoms, or a linear or branched alkoxy group having 1 to 6 carbon atoms, each $R^{22}$ is independently a halogen group or a linear or branched alkoxy group having 1 to 6 carbon atoms, provided that at least one of $R^{22}$ is an alkoxy group, each $R^{23}$ is independently hydrogen, a halogen group, or a linear or branched alkoxy group having 1 to 6 carbon atoms, l2 is an integer of 0 to 3, and m2 and n2 represent an integer of 1 to 3.

Specific examples of the pyridine derivative represented by formula (1) include 6-(2-methyloxyphenyl)-2-phenyl-4-(4-phenyl(4-methylphenyl)aminophenyl)pyridine, 2,6-bis(2-methyloxyphenyl)-4-(4-bis(4-methylphenyl)aminophenyl)pyridine, 2,6-bis(2-ethyloxyphenyl)-4-(4-bis(4-methylphenyl)aminophenyl)pyridine, 2,6-bis(2,4-diethyloxyphenyl)-4-(4-bis(4-methylphenyl) aminophenyl)pyridine, 2,6-bis(2,4-dipropyloxyphenyl)-4-(4-bis(4-methylphenyl) aminophenyl)pyridine, 2,6-bis(2,4-dibutyloxyphenyl)-4-(4-bis(4-methylphenyl) aminophenyl)pyridine, 2,6-bis(2,4-dipentyloxyphenyl)-4-(4-bis(4-methylphenyl) aminophenyl)pyridine, 2,6-bis(2,4-dihexyloxyphenyl)-4-(4-bis(4-methylphenyl) aminophenyl)pyridine, 2,6-bis(2,4,5-triethyloxyphenyl)-4-(4-bis(4-methylphenyl) aminophenyl)pyridine, 2-(2-ethoxyphenyl)-4-(4-bis(4-methylphenyl))aminophenyl)-6-(2,4-dimethyloxyphenyl)pyridine, 2,6-bis(2,4-diethyloxyphenyl)-4-(4-bis(3-methylphenyl) aminophenyl)pyridine, 2,6-bis(2,4-diethyloxyphenyl)-4-(4-bis(2-methylphenyl) aminophenyl)pyridine, 2,6-bis(2,4-diethyloxyphenyl)-4-(4-bis(4-ethylphenyl)aminophenyl)pyridine, 2,6-bis(2,4-diethyloxyphenyl)-4-(4-bis(4-propylphenyl) aminophenyl)pyridine, 2,6-bis(2,4-diethyloxyphenyl)-4-(4-bis(4-butylphenyl)aminophenyl)pyridine, 2,6-bis(2,4-diethyloxyphenyl)-4-(4-bis(4-pentylphenyl) aminophenyl)pyridine, 2,6-bis(2,4-diethyloxyphenyl)-4-(4-bis(4-hexylphenyl)aminophenyl)pyridine, 2,6-bis(2-ethyloxyphenyl)-4-(4-bis(4-t-butylphenyl)aminophenyl)pyridine, 2,6-bis(2,4-dimethyloxyphenyl)-4-(4-bis(4-t-butylphenyl) aminophenyl)pyridine, 2,6-bis(2,4-diethyloxyphenyl)-4-(4-bis(4-t-butylphenyl) aminophenyl)pyridine, 2,6-bis(4-d i-t-butyloxyphenyl)-4-(4-(4-methylphenyl) (4-t-butylphenyl)aminophenyl)pyridine, 2,6-bis(2,4-diethyloxyphenyl)-4-(4-bis(4-methyloxyphenyl) aminophenyl)pyridine, 2,6-bis(2,4-diethyloxyphenyl)-4-(4-bis(4-ethyloxyphenyl) aminophenyl)pyridine, 2,6-bis(2,4-diethyloxyphenyl)-4-(4-bis(4-propyloxyphenyl) aminophenyl)pyridine, 2,6-bis(2,4-diethyloxyphenyl)-4-(4-bis(4-butyloxyphenyl) aminophenyl)pyridine, 2,6-bis(2,4-diethyloxyphenyl)-4-(4-bis(4-pentyloxyphenyl) aminophenyl)pyridine, 2,6-bis(2,4-diethyloxyphenyl)-4-(4-bis(4-hexyloxyphenyl) aminophenyl)pyridine, 2-(4-fluorophenyl)-4-(4-bis(4-methylphenyl)aminophenyl)-6-(4-ethyloxyphenyl)pyridine, 2-(4-chlorophenyl)-4-(4-bis(4-methylphenyl)aminophenyl)-6-(4-ethyloxyphenyl)pyridine, 2-(4-bromophenyl)-4-(4-bis(4-methylphenyl)aminophenyl)-6-(4-ethyloxyphenyl)pyridine, 2,6-bis(4-chloro-2-ethyloxyphenyl)-4-(4-bis(4-methylphenyl)aminophenyl)pyridine,
2,6-bis(5-chloro-2,4-diethyloxyphenyl)-4-(4-bis(4-methylphenyl)aminophenyl)pyridine,
6-(2-methyloxyphenyl)-2-phenyl-4-(4'-phenyl(4-methylphenyl)aminobiphenyl-4-yl)pyridine,
2,6-bis(2-ethyloxyphenyl)-4-(4'-bis(4-methylphenyl)aminobiphenyl-4-yl)pyridine,
2,6-bis(2,4-dimethyloxyphenyl)-4-(4'-bis(4-methylphenyl)aminobiphenyl-4-yl)pyridine,
2,6-bis(2,4-diethyloxyphenyl)-4-(4'-bis(4-methylphenyl)aminobiphenyl-4-yl)pyridine,
2,6-bis(2,4-dipropyloxyphenyl)-4-(4'-bis(4-methylphenyl)aminobiphenyl-4-yl)pyridine,
2,6-bis(2,4-dibutyloxyphenyl)-4-(4'-bis(4-methylphenyl)aminobiphenyl-4-yl)pyridine,
2,6-bis(2,4-dipentyloxyphenyl)-4-(4'-bis(4-methylphenyl)aminobiphenyl-4-yl)pyridine,
2,6-bis(2,4-dihexyloxyphenyl)-4-(4'-bis(4-methylphenyl)aminobiphenyl-4-yl)pyridine,
2,6-bis(2,4,5-triethyloxyphenyl-4-(4'-bis(4-methyl phenyl)aminobiphenyl-4-yl)pyridine,
2,6-bis(2-ethyloxyphenyl)-4-(4'-bis(4-t-butylphenyl)aminobiphenyl-4-yl)pyridine,
2,6-bis(2,4-diethyloxyphenyl)-4-(4'-bis(4-t-butylphenyl)aminobiphenyl-4-yl)pyridine,
2,6-bis(2,4-diethyloxyphenyl)-4-(4'-bis(4-methyloxyphenyl)aminobiphenyl-4-yl)pyridine,
2,6-bis(2,4-diethyloxyphenyl)-4-(4'-bis(4-ethyloxyphenyl)aminobiphenyl-4-yl)pyridine,
2,6-bis(2,4-diethyloxyphenyl)-4-(4'-bis(4-propyloxyphenyl)aminobiphenyl-4-yl)pyridine,
2,6-bis(2,4-diethyloxyphenyl)-4-(4'-bis(4-butyloxyphenyl)aminobiphenyl-4-yl)pyridine,
2,6-bis(2,4-diethyloxyphenyl)-4-(4'-bis(4-pentyloxyphenyl)aminobiphenyl-4-yl)pyridine, and
2,6-bis(2,4-diethyloxyphenyl)-4-(4'-bis(4-hexyloxyphenyl)aminobiphenyl-4-yl)pyridine.

Among the pyridine derivatives represented by the formula (1), in order to exhibit a good reversibly thermochromic property which provides a vivid color during color development and turns colorless during decoloration, preferably, $R^{11}$ is a linear or branched alkyl group having 1 to 6 carbon atoms, $R^{12}$ is hydrogen or a linear or branched alkyl group having 1 to 6 carbon atoms, each $R^{13}$ is independently a halogen group or a linear or branched alkoxy group having 1 to 6 carbon atoms, provided that at least one of $R^{13}$ is an alkoxy group, each $R^{14}$ is independently hydrogen, a halogen group, or a linear or branched alkoxy group having 1 to 6 carbon atoms, l1 is 1, and m and n are each independently an integer of 1 to 3.

More preferably, $R^{11}$ is a linear or branched alkyl group having 1 to 4 carbon atoms, $R^{12}$ is hydrogen, or a linear or branched alkyl group having 1 to 4 carbon atoms, $R^{13}$ is a halogen group or a linear or branched alkoxy group having 1 to 4 carbon atoms, provided that at least one of $R^{13}$ is an alkoxy group, each $R^{14}$ independently represents hydrogen, a halogen group, or a linear or branched alkoxy group having 1 to 4 carbon atoms, l1 is 1, and m1 and n1 are integers of 1 to 2.

Specific examples of the pyridine derivative represented by formula (2) include
6-(2-methyloxyphenyl)-2-phenyl-4-(4-phenylaminophenyl)pyridine,
2,6-bis(2-methyloxyphenyl)-4-(4-phenylaminophenyl)pyridine,
2,6-bis(2,4-dimethyloxyphenyl)-4-(4-phenylaminophenyl)pyridine,
2,6-bis(2,4,5-trimethyloxyphenyl)-4-(4-phenylaminophenyl)pyridine,
2,6-bis(2-ethyloxyphenyl)-4-(4-phenylaminophenyl)pyridine,
2,6-bis(2-ethyloxyphenyl)-4-(4-(4-methylphenyl)aminophenyl)pyridine,
2,6-bis(2-ethyloxyphenyl)-4-(4-(2,4-dimethylphenyl)aminophenyl)pyridine,
2,6-bis(2-ethyloxyphenyl)-4-(4-(2,4,6-trimethylphenyl)aminophenyl)pyridine,
2,6-bis(2,4-diethyloxyphenyl)-4-(4-phenylaminophenyl)pyridine,
2,6-bis(2,4-diethyloxyphenyl)-4-(4-(4-methylphenyl)aminophenyl)pyridine,
2,6-bis(2,4-diethyloxyphenyl)-4-(4-(2,4-dimethylphenyl)aminophenyl)pyridine,
2,6-bis(2,4-diethyloxyphenyl)-4-(4-(2,4,6-trimethylphenyl)aminophenyl)pyridine,
2,6-bis(2,4-dipropyloxyphenyl)-4-(4-phenylaminophenyl)pyridine,
2,6-bis(2,4-dibutyloxyphenyl)-4-(4-phenylaminophenyl)pyridine,
2,6-bis(2,4-dipentyloxyphenyl)-4-(4-phenylaminophenyl)pyridine,
2,6-bis(2,4-dihexyloxyphenyl)-4-(4-phenylaminophenyl)pyridine,
2-(2-ethoxyphenyl)-6-(2,4-dimethyloxyphenyl)-4-(4-phenylaminophenyl)pyridine,
2,6-bis(2,4-diethyloxyphenyl)-4-(4-(4-ethylphenyl)aminophenyl)pyridine,
2,6-bis(2,4-diethyloxyphenyl)-4-(4-(4-propylphenyl)aminophenyl)pyridine,
2,6-bis(2,4-diethyloxyphenyl)-4-(4-(4-butylphenyl)aminophenyl)pyridine,
2,6-bis(2,4-diethyloxyphenyl)-4-(4-(4-pentylphenyl)aminophenyl)pyridine,
2,6-bis(2,4-diethyloxyphenyl)-4-(4-(4-hexylphenyl)aminophenyl)pyridine,
2,6-bis(2-ethyloxyphenyl)-4-(4-(4-t-butylphenyl)aminophenyl)pyridine,
2,6-bis(2,4-dimethyloxyphenyl)-4-(4-(4-t-butylphenyl)aminophenyl)pyridine,
2,6-bis(2,4-diethyloxyphenyl)-4-(4-(4-t-butylphenyl)aminophenyl)pyridine,
2,6-bis(4-di-t-butyloxyphenyl)-4-(4-(4-t-butylphenyl)aminophenyl)pyridine,
2,6-bis(2,4-diethyloxyphenyl)-4-(4-(4-methyloxyphenyl)aminophenyl)pyridine,
2,6-bis(2,4-diethyloxyphenyl)-4-(4-(4-ethyloxyphenyl)aminophenyl)pyridine,
2,6-bis(2,4-diethyloxyphenyl)-4-(4-(4-propyloxyphenyl)aminophenyl)pyridine,
2,6-bis(2,4-diethyloxyphenyl)-4-(4-(4-butyloxyphenyl)aminophenyl)pyridine,
2,6-bis(2,4-diethyloxyphenyl)-4-(4-(4-pentyloxyphenyl)aminophenyl)pyridine,
2,6-bis(2,4-diethyloxyphenyl)-4-(4-(4-hexyloxyphenyl)aminophenyl)pyridine,
2,6-bis(2,4-diethyloxyphenyl)-4-(4-(4-t-butyloxyphenyl)aminophenyl)pyridine,
6-(4-ethyloxyphenyl)-2-(4-fluorophenyl)-4-(4-phenylaminophenyl)pyridine,
2-(4-chloro phenyl)-6-(4-ethyloxyphenyl)-4-(4-phenylaminophenyl)pyridine, 2-(4-bromophenyl)-6-(4-ethyloxyphenyl)-4-(4-phenylaminophenyl)pyridine, 2,6-bis(4-chloro-2-ethyloxyphenyl)-4-(4-(4-methylphenyl)aminophenyl)pyridine, and 2,6-bis(4-chloro-2-ethyloxyphenyl)-4-(4-(2,4,6-trimethylphenyl)aminophenyl)pyridine.

Among the pyridine derivatives represented by the formula (2), in order to exhibit a good reversibly thermochromic property which provides a vivid color upon color development and turns colorless during decoloration, preferably, each $R^{21}$ is independently a linear or branched alkyl group having 1 to 6 carbon atoms, each $R^{22}$ is independently a halogen group or a linear or branched alkoxy group having 1 to 6 carbon atoms, provided that at least one of $R^{22}$ is an alkoxy group, each $R^{23}$ is independently hydrogen, a halogen group, or a linear or branched alkoxy group having 1 to 6 carbon atoms, l2 is an integer of 0 to 3, and m2 and n2 are integers of 1 to 3.

Still more preferably, each $R^{21}$ is independently a linear or branched alkyl group having 1 to 4 carbon atoms, each $R^{22}$ is independently a halogen group or a linear or branched alkoxy group having 1 to 4 carbon atoms, provided that at least one of $R^{22}$ is an alkoxy group, each $R^{23}$ is independently hydrogen, a halogen group, or a linear or branched alkoxy group having 1 to 4 carbon atoms, l2 is an integer of 0 to 3, and m2 and n2 represent an integer of 1 to 3.

Examples of the electron-accepting compounds of the component (b) according to the present invention include compounds having active protons, pseudo-acidic compounds (compounds which are not acids but each act as an acid in a composition to cause the component (a) to develop a color) and compounds having electron holes.

When the compounds having active protons are exemplified, examples of phenolic hydroxyl group-containing compounds include monophenols and polyphenols; these phenols further including as a substituent an alkyl group, an aryl group, an acyl group, an alkoxycarbonyl group, a carboxy group or an ester or an amide group thereof, a halogen group or the like; and phenol-aldehyde condensation resins such as bis-type phenols and tris-type phenols. Alternatively, the phenolic hydroxyl group-containing compounds may be metal salts of phenolic hydroxyl group-containing compounds.

Specific examples of the component (b) are given below:
phenol, o-cresol, tert-butyl catechol, nonylphenol, n-octylphenol, n-dodecylphenol, n-stearylphenol, p-chlorophenol, p-bromophenol, o-phenylphenol, n-butyl p-hydroxybenzoate, n-octyl p-hydroxybenzoate, resorcin, dodecyl gallate, 4,4-dihydroxydiphenylsulfone, bis(4-hydroxyphenyl)sulfide, 1,1-bis(4-hydroxyphenyl)ethane, 1,1-bis(4-hydroxyphenyl)propane, 1,1-bis(4-hydroxyphenyl)n-butane, 1,1-bis(4-hydroxyphenyl)n-pentane, 1,1-bis(4-hydroxyphenyl)n-hexane, 1,1-bis(4-hydroxyphenyl)n-heptane, 1,1-bis(4-hydroxyphenyl)n-octane, 1,1-bis(4-hydroxyphenyl)n-nonane, 1,1-bis(4-hydroxyphenyl)n-decane, 1,1-bis(4-hydroxyphenyl)n-dodecane, 1,1-bis(4-hydroxyphenyl)-2-methylpropane, 1,1-bis(4-hydroxyphenyl)-3-methylbutane, 1,1-bis(4-hydroxyphenyl)-3-methylpentane, 1,1-bis(4-hydroxyphenyl)-2,3-dimethylpentane, 1,1-bis(4-hydroxyphenyl)-2-ethylbutane, 1,1-bis(4-hydroxyphenyl)-2-ethylhexane, 1,1-bis(4-hydroxyphenyl)-3,7-dimethyloctane, 1,1-bis(4-hydroxyphenyl)cyclohexane, 1,1-bis(4-hydroxyphenyl)-3,3,5-trimethylcyclohexane, 1-phenyl-1,1-bis(4-hydroxyphenyl)ethane, 2,2-bis(4-hydroxyphenyl)propane, 2,2-bis(4-hydroxyphenyl)n-butane, 2,2-bis(4-hydroxyphenyl)n-pentane, 2,2-bis(4-hydroxyphenyl)n-hexane, 2,2-bis(4-hydroxyphenyl)n-heptan, 2,2-bis(4-hydroxyphenyl)n-octane, 2,2-bis(4-hydroxyphenyl)n-nonane, 2,2-bis(4-hydroxyphenyl)n-decane, 2,2-bis(4-hydroxyphenyl)n-dodecane, 2,2-bis(4-hydroxyphenyl)ethyl propionate, 2,2-bis(4-hydroxyphenyl)-4-methylpentane, 2,2-bis(4-hydroxyphenyl)-4-methylhexane, 2,2-bis(4-hydroxyphenyl)hexafluoropropane, 2,2-bis(4-hydroxy-3-methylphenyl)propane, 9,9-bis(4-hydroxy-3-methylphenyl)fluorene, 1,1-bis[2-(4-hydroxyphenyl)-2-propyl]benzene, bis(2-hydroxyphenyl)methane, 1,1,1-tris(4-hydroxyphenyl)ethane, and 3,3-bis(3-methyl-4-hydroxyphenyl)butane.

Although the compounds having phenolic hydroxyl groups can develop the thermochromic properties most effectively, it is also possible to use compounds selected from the group consisting of aromatic carboxylic acids, aliphatic carboxylic acids having 2 to 5 carbon atoms, metal salts of carboxylic acids, acidic phosphoric esters and metal salts thereof, and 1,2,3-triazole and derivatives thereof.

The component (c) of the reaction medium which reversibly induces an electron transfer reaction between the component (a) and the component (b) in a specific temperature range will be described.

Examples of the component (c) include alcohols, esters, ketones, ethers, and acid amides.

When the reversibly thermochromic composition according to the present invention is applied to microencapsulation and secondary processing, since low molecular weight ones evaporate out of a capsule when subjected to high heat treatment, in order to stably hold the composition inside the capsule, a compound having 10 or more carbon atoms is preferably used as the component (c).

As the alcohols, an aliphatic monohydric saturated alcohol having 10 or more carbon atoms is effectively employed. Specific examples thereof include decyl alcohol, undecyl alcohol, dodecyl alcohol, tridecyl alcohol, tetradecyl alcohol, pentadecyl alcohol, hexadecyl alcohol, heptadecyl alcohol, octadecyl alcohol, eicosyl alcohol, and dococyl alcohol.

As the esters, esters having 10 or more carbon atoms are effectively employed, and examples thereof include esters obtained by any optional combination of a monobasic carboxylic acid having an aliphatic group, and an alicyclic or aromatic ring, and a monohydric alcohol having an aliphatic group, and an alicyclic or aromatic ring; esters obtained by any optional combination of a polybasic carboxylic acid having an aliphatic group, and an alicyclic or aromatic ring, and a monohydric alcohol having an aliphatic group, and an alicyclic or aromatic ring; and esters obtained by any optional combination of a monobasic carboxylic acid having an aliphatic group, and an alicyclic or aromatic ring, and a polyhydric alcohol having an aliphatic group, and an alicyclic or aromatic ring. Specific examples thereof include ethyl caprylate, octyl caprylate, stearyl caprylate, myristyl caprate, dococyl caprate, 2-ethylhexyl laurate, n-decyl laurate, 3-methylbutyl myristate, cetyl myristate, isopropyl palmitate, neopentyl palmitate, nonyl palmitate, cyclohexyl palmitate, n-butyl stearate, 2-methylbutyl stearate, 3,5,5-trimethylhexyl stearate, n-undecyl stearate, pentadecyl stearate, stearyl stearate, cyclohexylmethyl stearate, isopropyl behenate, hexyl behenate, lauryl behenate, behenyl behenate, cetyl benzoate, stearyl p-tert-butylbenzoate, dimyristyl phthalate, distearyl phthalate, dimyristyl oxalate, dicetyl oxalate, dicetyl malonate, dilauryl succinate, dilauryl glutarate, diundecyl adipate, dilauryl azelate, di-(n-nonyl) sebacate, dineopentyl 1,18-octadecylmethylene dicarboxylate, ethylene glycol dimyristate, propylene glycol dilaurate, propylene glycol distearate, hexylene glycol dipalmitate, 1,5-pentanediol distearate, 1,2,6-hexanetriol trimyristate, 1,4-cyclohexanediol didecyl, 1,4-cyclohexanedimethanol dimyristate, xylene glycol dicaprinate, and xylene glycol distearate.

In addition, an ester compound selected out of an ester between a saturated fatty acid and a branched aliphatic alcohol, an ester between an unsaturated fatty acid, or a saturated fatty acid having a branch or a substituent, and an aliphatic alcohol that is branched or has 16 or more carbon atoms; and cetyl butyrate, stearyl butyrate, and behenyl butyrate, is also preferable.

Specific examples thereof include 2-ethylhexyl butyrate, 2-ethylhexyl behenate, 2-ethylhexyl myristate, 2-ethylhexyl caprate, 3,5,5-trimethylhexyl laurate, 3,5,5-trimethylhexy palmitate, 3,5,5-trimethylhexyl stearate, 2-methylbutyl caproate, 2-methylbutyl caprylate, 2-methylbutyl caprate, 1-ethylpropyl palmitate, 1-ethylpropyl stearate, 1-ethylpropyl behenate, 1-ethylhexyl laurate, 1-ethylhexyl myristate, 1-ethylhexyl palmitate, 2-methylpentyl caproate, 2-methylpentyl caprylate, 2-methylpentyl caprate, 2-methyl pentyl laurate, 2-methylbutyl stearate, 2-methylbutyl stearate, 3-methylbutyl stearate, 1-methylheptyl stearate, 2-methylbutyl behenate, 3-methylbutyl behenate, 1-methylheptyl stearate, 1-methylheptyl behenate, 1-ethylpentyl caproate, 1-ethylpentyl palmitate, 1-methylpropyl stearate, 1-methyloctyl stearate, 1-methylhexyl stearate, 1,1-dimethylpropyl laurate, 1-methylpentyl caprate, 2-methylhexyl palmitate, 2-methylhexyl stearate, 2-methylhexyl behenate, 3,7-dimethyloctyl laurate, 3,7-dimethyloctyl myristate, 3,7-dimethyloctyl palmitate, 3,7-dimethyloctyl stearate, 3,7-dimethyloctyl behenate, stearyl oleate, behenyl oleate, stearyl linoleate, behenyl linoleate, 3,7-dimethyloctyl erucate, stearyl erucate, isostearyl erucate, cetyl isostearate, stearyl isostearate, 2-methylpentyl 12-hydroxystearate, 2-ethylhexyl 18-bromostearate, isostearyl 2-ketomyristate, 2-ethylhexyl 2-fluoromyristate, cetyl butyrate, stearyl butyrate, an behenyl butyrate.

In addition, in order to exhibit a characteristic of large hysteresis with respect to a color density-temperature curve to change color and provide color memorability depending on a temperature change, a carboxylic ester compound exhibiting a ΔT value (melting point-cloudy point) of 5° C. or higher and less than 50° C. described in JP H4-17154 B is mentioned. Examples thereof include a carboxylic acid ester having a substituted aromatic ring in the molecule, an ester of a carboxylic acid having an unsubstituted aromatic ring and an aliphatic alcohol having 10 or more carbon atoms, a carboxylic acid ester having a cyclohexyl group in the molecule, an ester of a fatty acid having 6 or more carbon atoms and an unsubstituted aromatic alcohol or a phenol, a fatty acid having 8 or more carbon atoms and a branched aliphatic alcohol or ester, an ester of dicarboxylic acid and an aromatic alcohol or a branched aliphatic alcohol, dibenzyl cinnamate, heptyl stearate, didecyl adipate, dilauryl adipate, dimyristyl adipate, dicetyl adipate, distearyl adipated, Trilaurin, Trimyristin, Tristearin, Dimyristin, and Distearin.

A fatty acid ester compound obtained from an aliphatic monohydric alcohol having an odd number not less than 9 of carbon atoms, and an aliphatic carboxylic acid having an even number of carbon atoms, and a fatty acid ester compound with a total carbon number of 17 to 23 to be obtained from n-pentyl alcohol or n-heptyl alcohol and an aliphatic carboxylic acid having an even number from 10 to 16 of carbon atoms, are also effective.

Specific examples thereof include n-pentadecyl acetate, n-tridecyl butyrate, n-pentadecyl butyrate, n-undecyl caproate, n-tridecyl caproate, n-pentadecyl caproate, n-nonyl caprylate, n-undecyl caprylate, n-tridecyl caprylate, n-pentadecyl caprylate, n-heptyl caprate, n-nonyl caprate, n-undecyl caprate, n-tridecyl caprate, n-pentadecyl caprate, n-pentyl laurate, n-heptyl laurate, n-nonyl laurate, n-undecyl laurate, n-tridecyl laurate, n-pentadecyl laurate, n-pentyl myristate, n-heptyl myristate, n-nonyl myristate, n-undecyl myristate, n-tridecyl myristate, n-pentadecyl myristate, n-pentyl palmitate, n-heptyl palmitate, n-nonyl palmitate, n-undecyl palmitate, n-tridecyl palmitate, n-pentadecyl palmitate, n-nonyl stearate, n-undecyl stearate, n-tridecyl stearate, n-pentadecyl stearate, n-nonyl eicosanoate, n-undecyl eicosanoate, n-tridecyl eicosanoate, n-pentadecyl eicosanoate, n-nonyl behenate, n-undecyl behenate, n-tridecyl behenate, and n-pentadecyl behenate.

As the ketones, aliphatic ketones with a total carbon number of 10 or more are effectively employed. Examples thereof include 2-decanone, 3-decanone, 4-decanone, 2-undecanone, 3-undecanone, 4-undecanone, 5-undecanone, 2-dodecanone, 3-dodecanone, 4-dodecanone, 5-dodecanone, 2-tridecanone, 3-tridecanone, 2-tetradecanone, 2-pentadecanone, 8-pentadecanone, 2-hexadecanone, 3-hexadecanone, 9-heptadecanone, 2-pentadecanone, 2-octadecanone, 2-nonadecanone, 10-nonadecanone, 2-eicosanone, 11-eicosanone, 2-heneicosanone, 2-docosanone, laurone, and stearone.

Furthermore, examples thereof include aryl alkyl ketones with a total carbon number of 12 to 24 such as n-octadecanophenone, n-heptadecanophenone, n-hexadecanophenone, n-pentadecanophenone, n-tetradecanophenone, 4-n-dodecaacetophenone, n-tridecanophenone, 4-n-undecanoacetophenone, n-laurophenone, 4-n-decanoacetophenone, n-undecanophenone, 4-n-nonylacetophenone, n-decanophenone, 4-n-octylacetophenone, n-nonanophenone, 4-n-heptylacetophenone, n-octanophenone, 4-n-hexylacetophenone, 4-n-cyclohexylacetophenone, 4-tert-butylpropiophenone, n-heptaphenone, 4-n-pentylacetophenone, cyclohexyl phenyl ketone, benzyl n-butyl ketone, 4-n-butylacetophenone, n-hexanophenone, 4-isobutylacetophenone, 1-acetonaphthone, 2-acetonaphthone, and cyclopentyl phenyl ketone.

As the ethers, aliphatic ethers with a total carbon number of 10 or more are effectively employed. Examples thereof include dipentyl ether, dihexyl ether, diheptyl ether, dioctyl ether, dinonyl ether, didecyl ether, diundecyl ether, didodecyl ether, ditridecyl ether, ditetradecyl ether, dipentadecyl ether, dihexadecyl ether, dioctadecyl ether, decanediol dimethyl ether, undecanediol dimethyl ether, dodecanediol dimethyl ether, tridecanediol dimethyl ether, decanediol diethyl ether, and undecanediol diethyl ether.

Examples of the acid amides include acetamide, propionic acid amide, butyric acid amide, caproic acid amide, caprylic acid amide, capric acid amide, lauric acid amide, myristic acid amide, palmitic acid amide, stearic acid amide, behenic acid amide, oleic acid amide, erucic acid amide, benzamide, caproic acid anilide, caprylic acid anilide, capric acid anilide, lauric acid anilide, myristic acid anilide, palmitic acid anilide, stearic acid anilide, behenic acid anilide, oleic acid anilide, erucic acid anilide, N-methylcaproic acid amide, N-methylcaprylic acid amide, N-methylcapric acid amide, N-methyllauric acid amide, N-methylmyristic acid amide, N-methylpalmitic acid amide, N-methylstearic acid amide, N-methylbehenic acid amide, N-methyloleic acid amide, N-methylerucic acid amide, N-ethyllauric acid amide, N-ethylmyristic acid amide, N-ethylpalmitic acid amide, N-ethylstearic acid amide, N-ethyloleic acid amide, N-butyllauric acid amide, N-butylmyristic acid amide, N-butylpalmitic acid amide, N-butylstearic acid amide, N-butyloleic acid amide, N-octyllauric acid amide, N-octylmyristic acid amide, N-octylpalmitic acid amide, N-octylstearic acid amide, N-octyloleic acid amide, N-dodecyllauric acid amide, N-dodecylmyristic acid amide, N-dodecylpalmitic acid amide, N-dodecylstearic acid amide, N-dodecyloleic acid amide, dilauric acid amide, dimyristic acid amide, dipalmitic acid amide, distearic acid amide, dioleic acid amide, trilauric acid amide, trimyristic acid amide, tripalmitic acid amide, tristearic acid amide, trioleic acid amide, succinic acid amide, adipic acid amide, glutaric acid amide, malonic acid amide, azelaic acid amide, maleic acid amide, N-methylsuccinic acid amide, N-methyladipic acid amide, N-methylglutaric acid amide, N-methylmalonic acid amide, N-methylazelaic acid amide, N-ethylsuccinic acid amide, N-ethyladipic acid amide, N-ethylglutaric acid amide, N-ethylmalonic acid amide, N-ethylazelaic acid amide, N-butylsuccinic acid amide, N-butyladipic acid amide, N-butylglutaric acid amide, N-butylmalonic acid amide, N-octyladipic acid amide and N-dodecyladipic acid amide.

As the component (c), a compound expressed by the following formula (3) may be used:

[Chem. 7]

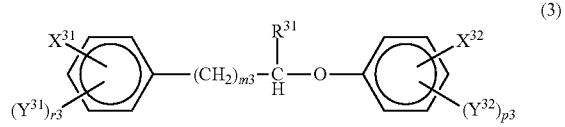
(3)

wherein $R^{31}$ represents a hydrogen atom, or a methyl group, m3 represents an integer of 0 to 2, one of $X^{31}$, and $X^{32}$ represents $-(CH_2)_{n3}OCOR^{32}$ or $-(CH_2)_{n3}COOR^{32}$, the other represents a hydrogen atom; n3 represents an integer of 0 to 2; $R^{32}$ represents an alkyl or alkenyl group having 4 or more carbon atoms, $Y^{31}$ and $Y^{32}$ represent a hydrogen atom, an alkyl group having 1 to 4 carbon atoms, a methoxy group, or a halogen, and r3 and p3 represent an integer of 1 to 3.

Among compounds represented by the formula (3), those in which $R^{31}$ is a hydrogen atom are suitable, because a reversibly thermochromic composition with a wider hysteresis width is obtainable, and those in which $R^{31}$ is a hydrogen atom and m3 is 0 are more suitable.

Among the compounds represented by the formula (3), compounds represented by the following formula (4) are used more preferably:

[Chem. 8]

(4)

wherein $R^{41}$ is an alkyl or alkenyl group having 8 or more carbon atoms, preferably an alkyl group having 10 to 24 carbon atoms, and more preferably an alkyl group having 12 to 22 carbon atoms.

Specific examples of the compound represented by the formula (4) include 4-benzyloxyphenylethyl octanoate, 4-benzyloxyphenylethyl nonanoate, 4-benzyloxyphenylethyl decanoate, 4-benzyloxyphenylethyl undecanoate, 4-benzyloxyphenylethyl dodecanoate, 4-benzyloxyphenylethyl tridecanoate, 4-benzyloxyphenylethyl tetradecanoate, 4-benzyloxyphenylethyl pentadecanoate, 4-benzyloxyphenylethyl hexadecanoate, 4-benzyloxyphenylethyl heptadecanoate, and 4-benzyloxyphenylethyl octadecanoate.

Further, as the component (c), a compound represented by the following formula (5) may be used:

[Chem. 9]

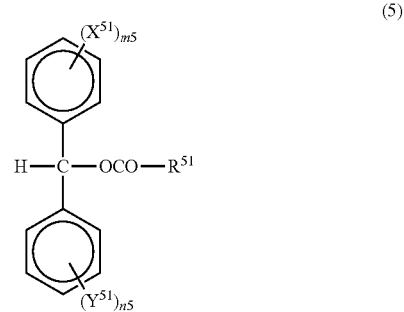
(5)

wherein $R^{51}$ represents an alkyl or alkenyl group having 8 or more carbon atoms, m5 and n5 independently represent an integer of 1 to 3, and each $X^{51}$ and $Y^{51}$ independently represent a hydrogen atom, an alkyl group having 1 to 4 carbon atoms, an alkoxy group having 1 to 4 carbon atoms, or a halogen.

Specific examples of the compound represented by the formula (5) include 1,1-diphenylmethyl octanoate, 1,1-diphenylmethyl nonanoate, 1,1-diphenylmethyl decanoate, 1,1-diphenylmethyl undecanoate, 1,1-diphenylmethyl dodecanoate, 1,1-diphenylmethyl tridecanoate, 1,1-diphenylmethyl tetradecanoate, 1,1-diphenylmethyl pentadecanoate, 1,1-diphenylmethyl hexadecanoate, 1,1-diphenylmethyl heptadecanoate, or 1,1-diphenylmethyl octadecanoate.

Further, as the component (c), a compound represented by the following formula (6) may be used:

[Chem. 10]

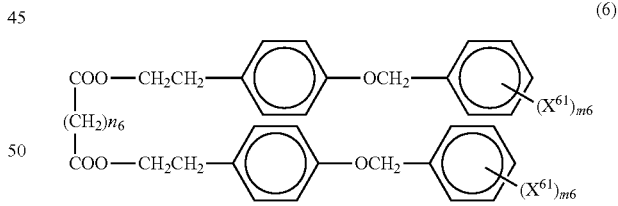
(6)

wherein $X^{61}$ represents a hydrogen atom, an alkyl group having 1 to 4 carbon atoms, a methoxy group, or a halogen atom, m6 represents an integer of 1 to 3, and n6 represents an integer of 1 to 20).

Examples of the compound represented by the formula (6) include diester of malonic acid with 2-[4-(4-chlorobenzyloxy)phenyl)]ethanol, diester of succinic acid with 2-(4-benzyloxyphenyl)ethanol, diester of succinic acid with 2-[4-(3-methylbenzyloxy)phenyl)]ethanol, diester of glutaric acid with 2-(4-benzyloxyphenyl)ethanol, diester of glutaric acid with 2-[4-(4-chlorobenzyloxy)phenyl)]ethanol, diester of adipic acid with 2-(4-benzyloxyphenyl)ethanol, diester of pimelic acid with 2-(4-benzyloxyphenyl)ethanol, diester of suberic acid with 2-(4-benzyloxyphenyl)ethanol, diester of suberic acid with 2-[4-(3-methylbenzyloxy)phenyl)]ethanol, diester of suberic acid with 2-[4-(4-chlorobenzyloxy)phenyl)]ethanol, diester of suberic acid with 2-[4-(2,4-dichlorobenzyloxy)phenyl)]ethanol, diester of azelaic acid with 2-(4-benzyloxyphenyl)ethanol, diester of sebacic acid with 2-(4-benzyloxyphenyl)ethanol, diester of 1,10-decanedicarboxylic acid with 2-(4-benzyloxyphenyl)ethanol, diester of 1,18-octadecanedicarboxylic acid with 2-(4-benzyloxyphenyl)ethanol, and diester of 1,18-octadecanedicarboxylic acid with 2-[4-(2-methyl benzyloxy)phenyl)]ethanol.

Further, as the component (c), a compound represented by the following formula (7) may be used:

[Chem. 11]

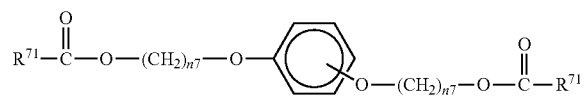

(7)

wherein $R^{71}$ represents an alkyl or alkenyl group having 1 to 21 carbon atoms, and n7 represents an integer of 1 to 3.

Examples of the compound represented by the formula (7) include diester of capric acid with 1,3-bis(2-hydroxyethoxy)benzene, diester of undecanoic acid with 1,3-bis(2-hydroxyethoxy)benzene, diester of lauric acid with 1,3-bis(2-hydroxyethoxy)benzene, diester of myristic acid with 1,3-bis(2-hydroxyethoxy)benzene, diester of butyric acid with 1,4-bis(hydroxymethoxy)benzene, diester of isovaleric acid with 1,4-bis(hydroxymethoxy)benzene, diester of acetic acid with 1,4-bis(2-hydroxyethoxy)benzene, diester of propionic acid with 1,4-bis(2-hydroxyethoxy)benzene, diester of valeric acid with 1,4-bis(2-hydroxyethoxy)benzene, diester of caproic acid with 1,4-bis(2-hydroxyethoxy)benzene, diester of carpylic acid with 1,4-bis(2-hydroxyethoxy)benzene, diester of capric acid with 1,4-bis(2-hydroxyethoxy)benzene, diester of lauric acid with 1,4-bis(2-hydroxyethoxy)benzene, and diester of myristic acid with 1,4-bis(2-hydroxyethoxy)benzene.

Further, as the component (c), a compound represented by the following formula (8) may be used:

[Chem. 12]

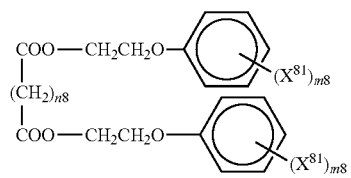

(8)

wherein $X^{81}$ represents a hydrogen atom, an alkyl group having 1 to 4 carbon atoms, an alkoxy group having 1 to 4 carbon atoms, or a halogen atom, m8 represents an integer of 1 to 3, and n8 represents an integer of 1 to 20.

Examples of the compound represented by the formula (8) include diester of succinic acid with 2-phenoxyethanol, diester of suberic acid with 2-phenoxyethanol, diester of sebacic acid with 2-phenoxyethanol, diester of 1,10-decanedicarboxylic acid with 2-phenoxyethanol, or diester of 1,18-octadecanedicarboxylic acid with 2-phenoxyethanol.

Further, as the component (c), a compound represented by the following formula (9) may be used:

[Chem. 13]

(9)

wherein $R^{91}$ represents an alkyl group having 4 to 22 carbon atoms, a cycloalkylalkyl group, a cycloalkyl group, or an alkenyl group having 4 to 22 carbon atoms, $X^{91}$ represents a hydrogen atom, an alkyl group having 1 to 4 carbon atoms, an alkoxy group having 1 to 4 carbon atoms, or a halogen atom, and n9 represents 0 or 1.

Examples of the compound represented by the formula (9) include decyl 4-phenylbenzoate, lauryl 4-phenylbenzoate, myristyl 4-phenylbenzoate, cyclohexylethyl 4-phenylbenzoate, octyl 4-biphenylacetate, nonyl 4-biphenylacetate, decyl 4-biphenylacetate, lauryl 4-biphenylacetate, myristyl 4-biphenylacetate, tridecyl 4-biphenylacetate, pentadecyl 4-biphenylacetate, cetyl 4-biphenylacetate, cyclopentyl 4-biphenylacetate, cyclohexylmethyl 4-biphenylacetate, hexyl 4-biphenylacetate, and cyclohexylmethyl 4-biphenylacetate.

Further, as the component (c), a compound represented by the following formula (10) may be used:

[Chem. 14]

(10)

wherein $R^{101}$ represents an alkyl group having 3 to 18 carbon atoms or an aliphatic acyl group having 3 to 18 carbon atoms, $X^{101}$ represents a hydrogen atom, an alkyl group having 1 to 3 carbon atoms, an alkoxy group having 1 or 2 carbon atoms, or a halogen atom, $Y^{101}$ represents a hydrogen atom or a methyl group, and $Z^{101}$ represents a hydrogen atom, an alkyl group having 1 to 4 carbon atoms, an alkoxy group having 1 or 2 carbon atoms, or a halogen atom.

Examples of the compound represented by the formula (10) include phenoxyethyl 4-butoxybenzoate, phenoxyethyl 4-pentyloxybenzoate, phenoxyethyl 4-tetradecyloxybenzoate, an ester of phenoxyethyl 4-hydroxybenzoate and dodecanoic acid, and a dodecyl ether of phenoxyethyl vanilliate.

Furthermore, as the component (c), a compound represented by the following formula (11) may be used:

[Chem. 15]

(11)

wherein $R^{111}$ represents an alkyl group having 4 to 22 carbon atoms, an alkenyl group having 4 to 22 carbon atoms, a cycloalkyl alkyl group, or a cycloalkyl group, $X^{111}$ represents a hydrogen atom, an alkyl group, an alkoxy group, or a halogen atom, $Y^{111}$ represents a hydrogen atom, an alkyl group, an alkoxy group or a halogen atom, and n11 represents 0 or 1.

Examples of the compound represented by the formula (11) include a benzoic acid ester of octyl p-hydroxybenzoate, a benzoic acid ester of decyl p-hydroxybenzoate, a p-methoxybenzoic acid ester of heptyl p-hydroxybenzoate, an o-methoxybenzoic acid ester of dodecyl p-hydroxybenzoate, and a benzoic ester of cyclohexylmethyl p-hydroxybenzoate.

As an electron-accepting compound, a reversibly thermochromic microcapsule pigment (reversibly thermochromic pigment) encapsulating a reversibly thermochromic composition of heat color-developing type (a color is developed by heating and lost by cooling) using a specific alkoxyphenol compound having straight chain or side chain alkyl group having 3 to 18 carbon atoms (JP H11-129623 A, JP H11-5973 A), a specific hydroxybenzoic ester (JP 2001-105732 A), a gallic ester (JP 51-44706 A, JP 2003-253149 A) or the like may be applied (see FIG. 3).

The reversibly thermochromic composition of the present invention is a compatible material containing, as essential components, the components (a), (b), and (c), and although the ratio of the components depends on the concentration, discoloration temperature, discoloration mode and kind of each component, in general, the component ratio at which desired characteristics are obtained is the component (b) within the range of from 0.1 to 100, preferably 0.1 to 50, more preferably 0.5 to 20, and the component (c) within the range of preferably from 5 to 200, preferably 5 to 100, more preferably 10 to 100, based on the component (a) 1 (each of the ratios is part(s) by mass).

In addition, various light stabilizers can be added as necessary.

The light stabilizer is contained to prevent photodegradation of the reversibly thermochromic composition including the components (a), (b) and (c), and is contained in an amount of 0.3 to 24% by mass and preferably 0.3 to 16% by mass based on 1% by mass of the component (a). Among the light stabilizers, an ultraviolet light absorber effectively cuts ultraviolet light contained in sunlight and the like to prevent a photo-deterioration that may be caused by excitation by the photo-reaction of the component (a). Antioxidants, singlet oxygen quenchers, superoxide anion quenchers, ozone quenchers, and the like restrain oxidation reaction due to light.

The light stabilizers may be used alone or in combination of two or more.

Although the reversibly thermochromic composition according to the present invention is effective even when used as it is, it is preferable that the composition be encapsulated in a microcapsule and used as a reversibly thermochromic microcapsule pigment (hereinafter may be simply referred to as a microcapsule pigment). This is because the reversibly thermochromic composition can maintain the same composition and the same working-effect can be obtained under various operation conditions.

As the microencapsulation method, conventionally known interfacial polymerization, in situ polymerization, submerged coat hardening method, phase separation from aqueous solution, phase separation from organic solvent, melt dispersion cooling method, aerial suspension coating method, spray drying method, and the like are known. The microencapsulation method is selected as needed, depending on the use purpose. Further, the microcapsule can be put into practical use after further forming a secondary resin coating film on the surface thereof in accordance with the intended use, so as to impart the microcapsule with durability or to modify the surface properties.

A chemically and physically stable pigment can be constituted by encapsulating the composition in a microcapsule. When the microcapsule pigment has a small average particle size, the dispersion stability and the processing suitability tend to improve, when blending the pigment into an ink composition, a paint, or a thermoplastic resin. Further, by forming the microcapsule pigment into fine particles, the $\Delta H$ value thereof can be increased relative to the $\Delta H$ value of the composition in which the three components are mixed. When the microcapsule pigment has a large average particle size, on the other hand, there is a tendency that a high-density color development can be achieved. The microcapsule pigment preferably has an average particle size of 0.01 to 50 μm, more preferably 0.1 to 30 μm, and particularly preferably 0.5 to 20 μm. When the average particle size of the microcapsule pigment is within this range, the pigment has an improved practicality.

The particle size can be measured using a laser diffraction/scattering-type particle size distribution analyzer [manufactured by Horiba, Ltd.; LA-300], and the average particle size (median diameter) can be calculated based on volume from the thus measured values.

The composition ratio of the content and the membrane wall (content:membrane wall) constituting the microcapsule pigment is preferably within a range of 7:1 to 1:1 (mass ratio), and it is possible to prevent a deterioration in the color density and vividness during color development by adjusting the ratio within the above range. The composition ratio of the content and the membrane wall (content:membrane wall) is more suitably 6:1 to 1:1 (mass ratio).

The reversibly thermochromic composition according to the present invention and the microcapsule pigment encapsulating the same is dispensed in a vehicle containing water and/or an organic solvent and various additives if necessary to be formed into an ink composition (hereinafter also simply referred to as "ink"), the resulting ink composition can be used as a reversibly thermochromic liquid composition for: (i) printing inks used in screen printing, offset printing, process printing, gravure printing, coater printing, pad printing, or the like; (ii) paints used in brush coating, spray coating, electrostatic coating, electrodeposition coating, flow coating, roller coating, dip coating, or the like; (iii) an ink for ink jet use, (iv) a UV curable ink, (v) writing instruments such as marking pens, ballpoint pens, fountain pens, and brush pens and inks for coating tools; (vi) painting colors; (vii) cosmetics; (viii) coloring liquids for fibers; and the like.

Various additives can be added to the reversibly thermochromic liquid composition, and examples of the additive include resins, cross-linking agents, curing agents, desiccants, plasticizers, viscosity-adjusting agents, dispersants, ultraviolet absorbers, antioxidants, light stabilizers, anti-settling agents, lubricants, gelling agents, antifoaming agents, delustering agents, penetrating agents, pH regulators, foaming agents, coupling agents, humectants, antifungal agents, preservatives, and anticorrosives.

Among them, as the vehicle for writing implement used in ink for writing implement, there may be mentioned an oily vehicle including an organic solvent, or an aqueous vehicle including water and if necessary an organic solvent.

Examples of the organic solvent include ethanol, propanol, butanol, glycerin, sorbitol, triethanolamine, diethanolamine, monoethanolamine, ethylene glycol, diethylene glycol, thiodiethylene glycol, polyethylene glycol, propylene glycol, butylene glycol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, ethylene glycol monomethyl ether acetate, sulfolane, 2-pyrrolidone, and N-methyl-2-pyrrolidone.

As the ink for writing implement, there may be mentioned a shear thinning ink containing a shear thinning agent in the vehicle; and a cohesive ink containing an aqueous polymeric cohesive agent in the vehicle to suspending the pigment in a loosely aggregated state.

When a shear thinning agent is added, it is possible not only to suppress cohesion and sedimentation of the pigment, but also to suppress spreading of the handwriting, so that a good handwriting can be formed.

Furthermore, in the case where the writing implement filled with the ink containing the shear thinning agent is a ballpoint pen, it is possible to prevent a leakage of the ink from an interval between a ball and a tip when not being used, or to prevent a reverse flowing of the ink when a writing front-end is disposed upward (erect state).

Examples of the shear thinning agent include xanthan gum, welan gum, succinoglycan (average molecular weight is about 1,000,000 to 8,000,000) that is an organic acid modified heteropolysaccharide of which constituent monosaccharides are glucose and galactose, guar gum, locust bean gum and a derivative thereof, hydroxyethylcellulose, alkyl alginate esters, a polymer containing alkyl esters of methacrylic acid as a main component and having a molecular weight of 100,000 to 150,000, glucomannan, thickening polysaccharides having a gelation ability extracted from seaweeds such as agar or carrageenin, benzyliden sorbitol and benzyliclen xylitol or a derivative thereof, a crosslinkable acrylic acid polymer, an inorganic fine particulate, polyglycerine fatty acid ester, polyoxyethylene sorbitan fatty acid ester, polyethylene glycol fatty acid ester, polyoxyethylene alkyl ether, polyoxypropylene alkyl ether, polyoxyethylene alkyl phenyl ether, a non-ionic surfactant such as fatty acid amide having an HLB value of 8 to 12, salts of dialkyl or dialkenyl sulfosuccinate, a mixture of N-alkyl-2-pyrrolidone and a anionic surfactant, and a mixture of polyvinylalcohol and an acrylic resin.

Examples of the water-soluble polymeric coagulant include polyvinylpyrrolidones, polyethylene oxides and water-soluble polysaccharides.

Examples of the aqueous polysaccharides include tragacanth gum, guar gum, pullulan, cyclodextrin and aqueous cellulose derivatives; and specific examples of the aqueous cellulose derivatives include methyl cellulose, hydroxyethyl cellulose, hydroxypropyl cellulose, hydroxyethylmethyl cellulose, and hydroxypropylmethyl cellulose.

By using a comb-type polymeric dispersant containing carboxyl groups in side chains and an organic nitrogen sulfur compound in combination with the polymeric coagulant, the dispersibility of loose aggregates of the microcapsule pigment formed by the action of the polymeric coagulant can be improved.

Although the comb type polymeric dispersant having carboxyl groups on its side chains is not particularly limited as long as the comb type polymeric compound has a plurality of carboxyl groups on its side chains, an acryl polymer compound having a plurality of carboxyl groups on its side chains is preferable, and may be exemplified by trade name: SOLSPERSE 43000 manufactured by Lubrizol, Co., Ltd. in Japan as the above compound.

The organic nitrogen sulfur compound further suppresses sedimentation of the microcapsule pigment due to vibration when the ink composition is filled in a writing instrument for practical use.

This further improves dispersibility that the loose aggregates of the microcapsule pigment are dispersed by the comb type polymeric dispersant having carboxyl groups on its side chains.

As the organic nitrogen sulfur compound, a compound selected from thiazole-based compounds, isothiazole-based compounds, benzothiazole-based compounds, and benzoisothiazole-based compounds, is used.

As specific examples of the organic nitrogen sulfur compound, one or two or more compounds selected from 2-(4-thiazoyl)-benzimidazole (TBZ), 2-(thiocyanatemethylthio)-1,3-benzothiazol (TCMTB), 2-methyl-4-isothiazolin-3-one, and 5-chloro-2-methyl-4-isothiazolin-3-one are used, and preferably, one or two or more compounds selected from 2-(4-thiazoyl)-benzimidazole (TBZ), 2-methyl-4-isothiazolin-3-one, and 5-chloro-2-methyl-4-isothiazolin-3-one are used.

The organic nitrogen sulfur compound may be exemplified by trade name: TOPSIDE 88, TOPSIDE 133, TOPSIDE 170, TOPSIDE 220, TOPSIDE 288, TOPSIDE 300, TOPSIDE 400, TOPSIDE 500, TOPSIDE 600, TOPSIDE 700Z, TOPSIDE 800, and TOPSIDE 950, manufactured by Permachem Asia Ltd.; and trade name: HOKUSTAR HP, HOKUSTAR E50A, HOKUSIDE P200, HOKUSIDE 6500, HOKUSIDE 7400, HOKUSIDE MC, HOKUSIDE 369, and HOKUSIDE R-150 manufactured by Hokko Sangyo Co., Ltd.

The mass ratio of the comb type polymeric dispersant having carboxyl groups on its side chains and the organic nitrogen sulfur compound is preferably 1:1 to 1:10, and more preferably 1:1 to 1:5. By satisfying the above range, it is possible to sufficiently develop dispersibility of the loose aggregates of the microcapsule pigment and suppression of the sedimentation of the microcapsule pigment by vibration.

Further, addition of an aqueous resin allows for imparting the ink with fixability on paper surface of the handwriting and viscosity. The water-soluble resin also has an effect of further improving stability of the microcapsule pigment in the ink including the above-described comb type polymeric dispersant having carboxyl groups on its side chains and the organic nitrogen sulfur compound.

Examples of the water-soluble resin include alkyd resins, acrylic resins, styrene-maleic acid copolymers, cellulose derivatives, polyvinylpyrrolidones, polyvinyl alcohols and dextrin, among which a polyvinyl alcohol is preferably used.

Further, among the polyvinyl alcohols, a partial saponification type polyvinyl alcohol having a degree of saponification of 70 to 89% by mol is more suitably used because it has good solubility even when the pH of the ink is in an acidic range.

The aqueous resin is added to the ink in an amount within the range of 0.3 to 3.0% by mass, and preferably 0.5 to 1.5% by mass.

Moreover, in the case where the ink is used with being filled in a ballpoint pen, it is preferable that the abrasion of a ball receiving sheet be prevented by adding lubricants including higher fatty acids such as oleic acid, non-ionic surfactants having a long chain alkyl group, polyether modified silicone oil, thiophosphorous acid triesters such as thiophosphorous acid tri(alkoxycarbonyl methyl ester) or thiophosphorous acid tri(alkoxycarbonyl ethyl ester), phosphoric acid monoester of polyoxyethylene alkyl ether or polyoxyethylene alkylaryl ether, phosphoric acid diester of polyoxyethylene alkyl ether or polyoxyethylene alkylaryl ether, and metal salts, ammonium salts, amine salts, and alkanolamine salts thereof.

In addition, the following may be added to the ink, if necessary: (i) a resin which imparts the ink with fixability on paper surface and viscosity by adding a resin, such as an acrylic resin, a styrene-maleic acid copolymer, a cellulose derivative, polyvinylpyrrolidone, polyvinyl alcohol, or dextrin; (ii) an inorganic salt such as sodium carbonate, sodium phosphate, or sodium acetate; or a pH regulator, for example, an organic basic compound such as an aqueous amine compound; (iii) an anticorrosive such as benzotriazole, tolyltriazole, dicyclohexylammonium nitrite, diisopropylammonium nitrite, or saponin; (iv) a preservative or an antifungal agent, such as phenol, sodium salt of 1,2-benzthiazolin-3-one, sodium benzoate, sodium dehydroacetate, potassium sorbate, paraoxypropylbenzoate, or 2,3,5,6-tetrachloro-4-(methylsulfonyl)pyridine; (v) a wetting agent such as urea, a non-ionic surfactant, a reduced or non-reduced starch hydrolysate, an oligosaccharide such as trehalose, sucrose, cyclodextrin, glucose, dextrin, sorbitol, mannitol, or sodium pyrophosphate; (vi) an antifoaming agent; (vii) a dispersant; and/or (viii) a fluorine-based or non-ionic surfactant which improves the permeability of the ink.

The ink can contain the microcapsule pigment in an amount of preferably 5 to 40% by mass, more preferably 10 to 40% by mass, and still more preferably 10 to 30% by mass, with respect to the total mass of the ink. By controlling the amount of the microcapsule pigment in this range, a desirable color development density can be achieved and deterioration of the ink outflow properties can be inhibited.

A writing instrument capable of storing the ink according to the present invention will now be described. In one embodiment, the writing instrument includes: an axial barrel which stores the ink; and a pen body which delivers the ink stored in the axial barrel. Examples of the pen body include a marking pen body, a ballpoint pen body, and a brush pen body. Examples of the marking pen body include marking tips such as fiber tips, felt tips, and plastic tips. Examples of the ballpoint pen body include ballpoint pen tips. Examples of the brush pen body include fiber bundles in which fibers are tightly bundled with each other along the longitudinal direction; plastic porous articles having continuous pores; heat-fused or resin-processed articles of synthetic resin fibers; and extrusion-molded articles of a soft resin or an elastomer.

The use of the ink according to the present invention in a ballpoint pen or a marking pen will now be described in more detail.

In the case where the ink according to the present invention is filled in a ballpoint pen, the structure and shape of the ballpoint pen itself are not particularly limited. Examples thereof include a ballpoint pen having an ink-storing tube in which a shear thinning ink is filled in an axial barrel, in which the ink-storing tube is connected with a ballpoint pen tip where a ball is mounted on its front-end, and a liquid plug for preventing backflow is closely contacted in the edge of the ink in the ink-storing tube.

The ballpoint pen tip will be explained in more detail. There can be applied a tip formed by holding a ball in a ball holding part in which the vicinity of a front-end of a metal pipe is pressed and deformed inwardly from the outside; a tip formed by holding a ball in a ball holding part formed by cutting a metal material by a drill and the like; a tip in which a ball receiving sheet made of a resin is provided in the tip made of metal or plastic; or a tip in which a ball held in the tip is pressed in a front direction by a spring.

The ball made of cemented carbide, stainless steel, ruby, ceramic, resin, rubber, and the like, and having a diameter of about 0.3 to 2.0 mm, preferably 0.3 to 1.5 mm, and more preferably 0.3 to 1.0 mm can be applicable.

As the ink-storing tube which stores the ink, for example, a molded article made of a thermoplastic resin such as polyethylene, polypropylene, polyethylene terephthalate, or nylon or a metal tube can be used.

The ink-storing tube may be directly connected with the tip, or the ink-storing tube may be connected with the tip via a connection member.

Incidentally, the ink-storing tube may be a refill type in which the refill is stored in an axial barrel made of a resin or metal, or the ink may be directly filled in an axial barrel in which the axial barrel mounting a tip in its front-end is used itself as an ink-storing tube.

Moreover, in the case where the ink is stored in a retractable ballpoint pen, the structure and shape of the retractable ballpoint pen are not particularly limited, and any structure can be adopted so long as the writing front-end provided in the ballpoint pen refill is received in the axial barrel while being exposed to the atmosphere and the writing front-end is protruded from the opening part of the axial barrel by actuation of the in-and-out type mechanism.

The retractable ballpoint pens can be classified into, for example, knock-type ballpoint pens, rotation-type ballpoint pens, and slide-type ballpoint pens.

The knock-type ballpoint pens can take, for example, a configuration in which a knocking part is arranged on the rear end or side of the axial barrel and the ballpoint pen tip is projected from the front-end opening of the axial barrel by pushing the knocking part, or a configuration in which the ballpoint pen tip is projected from the front-end opening of the axial barrel by pushing a clip arranged on the axial barrel.

The rotation-type ballpoint pens can take, for example, a configuration in which a rotary part is arranged on a rear part of the axial barrel and the ballpoint pen tip is projected and retracted through the front-end opening of the axial barrel by rotating the rotary part.

The slide-type ballpoint pens can take, for example, a configuration in which a slide is arranged on the side of the axial barrel and the ballpoint pen tip is projected and retracted through the front-end opening of the axial barrel by operating the slide, or a configuration in which the ballpoint pen tip is projected and retracted through the front-end opening of the axial barrel by sliding a clip arranged on the axial barrel.

The retractable ballpoint pens may be of a complex type in which a plurality of ballpoint pen refills are stored in the axial barrel and the writing end of any one of the ballpoint pen refills is projected and retracted through the front-end opening of the axial barrel by the action of a projection-retraction mechanism.

In general, an ink follower is filled at the end face at the rear end of the ink stored in the ink-storing tube.

The composition of the ink follower includes a non-volatile liquid or a hardly volatile liquid.

Specific examples thereof include vaseline, spindle oil, castor oil, olive oil, mineral oil refineries, liquid paraffine, polybutene, α-olefine, oligomer and co-oligomer of α-olefine, dimethyl silicone oil, methylphenyl silicone oil, amino modified silicone oil, polyether modified silicone oil, and fatty acid modified silicone oil. It can be used alone or in combination of two or more thereof.

It is preferable that the viscosity of the non-volatile liquid and/or hardly volatile liquid be increased to a suitable viscosity by adding a thickening agent. There may be mentioned, as the thickening agent, silica having hydrophobic treated surface; particulate silica having a methylated surface; aluminum silicate; swellable mica; a clay-based thickening agent such as hydrophobically treated bentonite or montmorilonite; fatty acid metal soaps such as magnesium stearate, calcium stearate, aluminum stearate, and zinc stearate; a dextrin-based compound such as tribenzylidene sorbitol, fatty acid amide, amide modified polyethylene wax, hydrogenated castor oil, or fatty acid dextrin; and a cellulose-based compound.

Further, it is also possible to use a liquid ink follower in combination with a solid ink follower.

In the case where the ink according to the present invention is filled in a marking pen, the structure and shape of the marking pen itself are not particularly limited. Examples thereof include a marking pen in which an ink occlusion body containing fiber bundle is embedded in an axial barrel, a marking pen tip containing a processed fiber having a capillary gap therein is mounted directly or via a connection member on the axial barrel, and a cohesive ink is impregnated into the ink occlusion body of the marking pen formed by connecting the ink occlusion body and the tip, or a marking pen in which the tip and the ink-storing tube are arranged through a valve body that opens by pressing the tip and the ink is directly stored in the ink-storing tube.

The tip is a generally known porous member having communication pores of which porosity is selected within the range of about 30 to 70%, made of processed resin of fibers, fusion processed bodies of hot-melt fiber, or a felt, and the tip is provided for practical use by processed its one end in a cannonball form, a rectangular form, or a chisel form depending on the purpose.

The ink occlusion body is configured by bundling crimped fibers in a length direction, incorporating them into a covering material such as a plastic tube or a film, and adjusting its porosity within a range of about 40 to 90%.

As the valve body, a generally known pumping type may be used, and also it is preferred the one in which a spring pressure is adjusted so that the valve can be opened by pen pressure.

The shape of the ballpoint pen or marking pen is not limited to the above-described one, but may be a both head type writing instrument in which tips of different type are provided or pen ends for introducing inks of different colors are provided.

A handwriting produced by writing on a writing surface using a writing instrument containing the ink for writing implement is allowed to change its color by the work of a heating tool or cooling tool.

As the heating tool, for example, an electro-heating discoloration device equipped with a resistance heating element, a heating discoloration device loaded with hot water or the like, or a hair dryer can be suitably used; however, a friction member is preferably used as a means which enables discoloration by a simple method. Particularly, an elastic material that is not abraded by rubbing is preferred.

The friction member is preferably an elastic material such as an elastomer or foamed plastic, which has excellent elasticity and is capable of generating appropriate friction when rubbed and thereby producing frictional heat.

A handwriting can also be rubbed with an ordinary rubber eraser used for erasing handwriting with a pencil; however, since eraser crumbs are generated by the rubbing, the above-described friction member which hardly generates such crumbs is preferably used.

As the material of the friction member, for example, a silicone resin, an SEBS resin (styrene-ethylene-butadiene-styrene block copolymer), an SEPS resin (styrene-ethylene-propylene-styrene block copolymer), a polyester resin, EPDM (ethylene propylene rubber), or the like is used.

The friction member can be combined with a writing instrument and other member having an arbitrary shape (friction body) to obtain a writing instrument set, and excellent portability is attained by arranging the friction member on the writing instrument.

In the case of a writing instrument equipped with a cap, the position at which the friction member is arranged is not particularly restricted. For example, the cap itself can be formed by the friction member; the axial barrel itself can be formed by the friction member; when a clip is arranged, the clip itself can be formed by the friction member; or the friction member can be arranged on the front end (crown) of the cap or the rear end of the axial barrel (the part where a writing end is not arranged).

In the case of a retractable writing instrument as well, the position at which the friction member is arranged is not particularly restricted. For example, the axial barrel itself can be formed by the friction member; when a clip is arranged, the clip itself can be formed by the friction member; or the friction member can be arranged in the vicinity of an opening of the axial barrel, on the rear end of the axial barrel (the part where a writing end is not arranged), or on the knocking part.

As the cooling tool, for example, a cryogenic discoloration device utilizing a Peltier element, a cryogenic discoloration device loaded with a refrigerant such as cold water or crushed ice, a refrigerator, or a freezer can be suitably used.

The material of the support on which the reversibly thermochromic liquid composition is applied or printed is not limited and every material is effective, and its examples include paper, synthetic paper, fiber, fabric, synthetic leather, leather, plastics, glass, pottery materials, metals, wood, and stone, which may be not only in a flat shape but also in an irregular form.

By arranging a reversibly thermochromic layer containing the reversibly thermochromic composition on the support, a laminate (printed article) can be obtained.

In cases where a non-thermochromic colored layer (including an image) has been formed on the support in advance, the colored layer can be made visible or invisible depending on temperature change by applying thereto a reversibly thermochromic layer, and this enables to further diversify the mode of change.

Further, the microcapsule pigment can also be melt-blended with a thermoplastic resin, thermosetting resin, wax, or the like into the form of a pellet, powder, or paste and utilized as a resin composition for forming a reversibly thermochromic molded article. By a widely used means such as injection molding, extrusion molding, blow molding, or cast molding, a molded article in the form of a three-dimensional article of an arbitrary shape, film, sheet, plate, filament, rod, pipe, or the like can be obtained.

Moreover, crayons, pencil leads, and mechanical pencil leads can also be obtained by melt-blending the microcapsule pigment into a thermoplastic resin or wax.

Also, an ordinarily employed dyestuff or pigment (non-thermochromic one) may be added to the liquid composition or resin composition to cause discoloration behavior from color (1) to color (2).

It is possible to improve light resistance of the product by laminating a layer containing a light stabilizer and/or transparent metalescent pigment over the laminated product or the molded product formed by using the resin composition, or it is possible to improve durability of the product by providing a topcoat layer thereon.

Examples of the light stabilizer include ultraviolet absorbers, antioxidants, singlet oxygen quenchers, superoxide anion quenchers, and ozone quenchers.

Examples of the transparent metallic luster pigment include pigments prepared by coating the surface of a core substance, such as natural mica, synthetic mica, glass piece, alumina, or transparent film piece, with a metal oxide such as titanium oxide.

Specific examples of products including any of the reversibly thermochromic composition and the microcapsule pigment encapsulating the same are listed below.

(1) Toys:
dolls and animal-figured toys; hair of dolls and animal-figured toys; dollhouses and furnitures thereof; doll accessories such as clothes, hats, bags, and shoes; accessory toys; stuffed dolls and animals; painting toys; illustrated books for toys; puzzle toys such as jigsaw puzzles; toy bricks; block toys; clay toys; fluid toys; spinning tops; kites; musical toys; cooking toys; gun toys; capturing toys; background toys; toys imitating vehicles, animals, plants, buildings, and food articles; and the like (2) Clothing:
outerwears such as T-shirts, sweaters, blouses, dresses, swimsuits, raincoats, and ski wears; footwears such as shoes and shoelaces; personal effects made of cloth, such as handkerchiefs, towels, and wrapping cloths; gloves; neckties; hats; and the like (3) Interior Ornaments:
rugs, curtains, curtain cords, tablecloths, carpets, cushions, picture frames, imitation flowers, photo stands, and the like (4) Furnitures:
beddings such as bedclothes, pillows, and mattresses; lighting fixtures; air conditioners; and the like (5) Accessories:
rings, bracelets, tiaras, earrings, hair stoppers, artificial nails, ribbons, scarfs, watches, glasses, and the like (6) Stationeries:
writing instruments, stamps, erasers, celluloid boards, rulers, adhesive tapes, and the like (7) Daily Necessaries:
cosmetics such as lipsticks, eye-shadows, manicures, hair dyes, artificial nails, and paints for artificial nails; toothbrushes; and the like (8) Kitchen Utensils:
cups, dishes, chopsticks, spoons, forks, pots, frying pans, and the like (9) Other Products:
various printed articles, such as calendars, labels, cards, recording materials, and those for forgery prevention; books such as illustrated books; bags; packaging containers; embroidery threads; sporting gears; coasters; musical instruments; pocket warmers; refrigerants; pouches such as wallets; umbrellas; vehicles; buildings; indicators for temperature detection; training and learning articles; and the like

EXAMPLES

Examples will be described below. Incidentally, the term "part(s)" in the following Examples means part(s) by mass.

First, an example including the pyridine derivative represented by the formula (1) as the component (a) is shown.

Example 101

Preparation of Reversibly Thermochromic Composition

A reversibly thermochromic composition changing from fluorescent orange color to colorless was obtained by mixing 1 part of 2,6-bis(2-ethyloxyphenyl)-4-(4-bis(4-methylphenyl)aminophenyl)pyridine as the component (a), 5 parts of 1,1-bis(4'-hydroxyphenyl)n-decane and 4 parts of 2,2-bis(4'-hydroxyphenyl)hexafluoropropane as the component (b), and 25 parts of myristyl alcohol and 25 parts of butyl stearate as the component (c), followed by heating to dissolve them.

The complete coloration temperature ($t_1$) of the reversibly thermochromic composition was 7° C., the coloring starting temperature ($t_2$) was 12° C., the decoloring starting temperature ($t_3$) was 10° C., the complete decoloring temperature ($t_4$) was 15° C., and the hysteresis width ($\Delta H$) was 3° C.

Examples 102 to 111

Preparation of Microcapsule Pigment

A reversibly thermochromic composition was prepared by the same method as Example 101 using the components (a) and (c) shown in the following table, and a microcapsule pigment suspension encapsulated in a microcapsule was obtained by interfacial polymerization.

The resulting microcapsule pigment suspension was subjected to centrifugation to isolate a pigment, and thus to obtain a microcapsule pigment having an average particle size of 2 μm.

Bracketed numbering in the table indicates parts by mass.

TABLE 1

| Example | Component (a) | Component (b) | Component (c) | Color change |
|---|---|---|---|---|
| 102 | 2,6-bis(2,4-diethyloxyphenyl)-4-(4-bis(4-methylphenyl)aminophenyl)pyridine (1) | 2,2-bis(4'-hydroxyphenyl)hexafluoropropane (8) | 4-benzyloxyphenylethyl caprylate (50) | Fluorescent orange ↕ Colorless |
| 103 | 2,6-bis(2,4-dipropyloxyphenyl)-4-(4-bis(4-methylphenyl)aminophenyl)pyridine (1) | Bis(4-hydroxyphenyl)sulfide (8) | Neopentylstearate (50) | Fluorescent orange ↕ Colorless |
| 104 | 2,6-bis(2,4-dibutyloxyphenyl)-4-(4-bis(4-methylphenyl)aminophenyl)pyridine (1) | Laurylgallate (8) | Octadecyldecanoate (50) | Fluorescent orange ↕ Colorless |
| 105 | 2,6-bis(2,4-diethyloxyphenyl)-4-(4-bis(3- | 2,2'-methylenebis(4-chlorophenol) | Stearylstearate (50) | Fluorescent yellow ↕ |

TABLE 1-continued

| Example | Component (a) | Component (b) | Component (c) | Color change |
|---|---|---|---|---|
|  | methylphenyl)aminophenyl)pyridine (1) | (8) |  | Colorless |
| 106 | 2,6-bis(2-ethyloxyphenyl)-4-(4-bis(4-t-butylphenyl)aminophenyl)pyridine (1) | 1,1-bis(4'-hydroxyphenyl)n-decane (8) | 9-Heptadecanone (25) Cetylalcohol (25) | Fluorescent orange ↕ Colorless |
| 107 | 2,6-bis(2-dimethyloxyphenyl)-4-(4-bis(4-t-butylphenyl)aminophenyl)pyridine (1) | 2,2-bis(4'-hydroxyphenyl)hexafluoropropane (8) | 4-benzyloxyphenyl lethyl caprate (50) | Fluorescent orange ↕ Colorless |
| 108 | 2,6-bis(2-dimethyloxyphenyl)-4-(4-bis(4-t-butylphenyl)aminophenyl)pyridine (1) | bis(4-hydroxyphenyl)sulfide (8) | Neopentylstearate (50) | Fluorescent orange ↕ Colorless |
| 109 | 2,6-bis(2,4-dimethyloxyphenyl)-4-(4-bis(4-methylphenyl)aminophenyl)pyridine (1) | laurylgallate (8) | Octadecyldecanoate (50) | Fluorescent orange ↕ Colorless |
| 110 | 2,6-bis(5-chloro-2,4-diethyloxyphenyl)-4-(4-bis(4-methylphenyl)aminophenyl)pyridine (1) | 2,2'-methylenebis(4-chlorophenol) (8) | Stearylstearate (50) | Fluorescent orange ↕ Colorless |
| 111 | 2,6-bis(2,4-diethyloxyphenyl)-4-(4'-bis(4-t-butylphenyl)aminophenyl-4-yl)pyridine (1) | 1,1-bis(4'-hydroxyphenyl)n-decane (8) | 9-Heptadecanone (25) Cetylalcohol (25) | Fluorescent orange ↕ Colorless |

Comparative Example 101

Preparation of Reversibly Thermochromic Composition

A reversibly thermochromic composition changing from fluorescent orange color to colorless was obtained by mixing 1 part of 2,6-bis(4-dimethylaminophenyl)-4-(4-methoxyphenyl)pyridine as the component (a), 4 parts of 1,1-bis(4'-hydroxyphenyl)n-decane and 4 parts of 2,2-bis(4'-hydroxyphenyl)hexafluoropropane as the component (b), and 25 parts of myristyl alcohol and 25 parts of butyl stearate as the component (c), followed by heating to dissolve them.

The complete coloration temperature ($t_1$) of the reversibly thermochromic composition was 7° C., the coloring starting temperature ($t_2$) was 11° C., the decoloring starting temperature ($t_3$) was 9° C., the complete decoloring temperature ($t_4$) was 15° C., and the hysteresis width ($\Delta H$) was 3° C.

Comparative Examples 102 to 105

Preparation of Microcapsule Pigment

A reversibly thermochromic composition was prepared by the same method as Comparative Example 101 using the components (a) and (c) shown in the following table, and a microcapsule pigment suspension encapsulated in a microcapsule was obtained by interfacial polymerization.

The resulting microcapsule pigment suspension was subjected to centrifugation to isolate a pigment, and thus to obtain a microcapsule pigment having an average particle size of 2 μm.

Bracketed numbering in the table indicates parts by mass.

TABLE 2

| Comparative Example | Component (a) | Component (b) | Component (c) | Color change |
|---|---|---|---|---|
| 102 | 2,6-bis(4-dimethylaminophenyl)-4-phenylpyridine (1) | 2,2-bis(4'-hydroxyphenyl)hexafluoropropane (8) | 4-benzyloxyphenylethyl caprylate (50) | Fluorescent orange ↕ Colorless |
| 103 | 2-(4-dimethylaminophenyl)-4-methoxyquinazolin (1) | bis(4-hydroxyphenyl)sulfide (8) | Neopentylstearate (50) | Fluorescent yellow ↕ Colorless |
| 104 | 4,4'-(ethylenedioxy)-bis(2-(4-dimethylaminophenyl)quinazoline) (1) | laurylgallate (8) | Octadecyldecanoate (50) | Fluorescent yellow ↕ Colorless |
| 105 | 2-(4-dimethylaminophenyl)-4-(4-nitrophenyl)-oxy-quinazoline (1) | 2,2-methylenebis(4-chlorophenol) (8) | Stearylstearate (50) | Fluorescent orange ↕ Colorless |

Preparation of Measuring Sample

The reversibly thermochromic compositions of Example 101 and Comparative Example 101 were uniformly heated and melted, and then impregnated into filter paper (made by Toyo Filter Paper Co., Ltd. No. 2 filter paper) to obtain a measurement sample.

A thermochromic color-memory ink was prepared by uniformly dispersing 40 parts of the microcapsule pigments of Examples 102 to 111 and Comparative Examples 102 to 105 in an aqueous ink vehicle composed of 50 parts of an ethylene-vinyl acetate resin emulsion, 1 part of a leveling agent, 1 part of an antifoaming agent, 0.5 parts of a viscosity regulator, and 7.5 parts of water.

A measuring sample was obtained by screen-printing a solid pattern on a high-quality paper by using this ink.

Measurement of Hysteresis Characteristics

The measuring sample was placed in the measurement portion of the colorimeter (TC-3600 type colorimeter, manufactured by Tokyo Denshoku, Co., Ltd.), temperature of the sample portion was increasing or decreasing at a speed of 2° C./min to measure a brightness value as color density at each temperature, to thereby plot a color density-temperature curve. From the color density-temperature curve, $t_1$, $t_2$, $t_3$, $t_4$, and $\Delta H$ (hysteresis width: temperature at a midpoint between $t_3$ and $t_4$—temperature at a midpoint between $t_1$ and $t_2$) were determined.

The following table shows the test results.

TABLE 3

| | Complete coloration temperature $t_1$ (° C.) | Coloring starting temperature $t_2$ (° C.) | Decoloring starting temperature $t_3$ (° C.) | Complete decoloring temperature $t_4$ (° C.) | $\Delta H$ |
|---|---|---|---|---|---|
| Example 102 | −18 | −7 | 48 | 64 | 68.5 |
| Example 103 | 13 | 15 | 28 | 32 | 16 |
| Example 104 | 26 | 31 | 30 | 39 | 6 |
| Example 105 | 43 | 51 | 45 | 58 | 4.5 |
| Example 106 | 28 | 30 | 29 | 35 | 3 |
| Example 107 | −18 | −8 | 47 | 64 | 68.5 |
| Example 108 | 14 | 16 | 29 | 32 | 15.5 |
| Example 109 | 26 | 30 | 31 | 39 | 7 |
| Example 110 | 44 | 50 | 46 | 58 | 5 |
| Example 111 | 28 | 29 | 30 | 35 | 4 |
| Comparative Example 102 | −17 | −5 | 45 | 63 | 65 |
| Comparative Example 103 | 13 | 15 | 28 | 32 | 16 |
| Comparative Example 104 | 26 | 31 | 34 | 39 | 8 |
| Comparative Example 105 | 43 | 51 | 46 | 58 | 5 |

Light Resistance Test

After each measurement sample was cooled to below the complete coloring temperature ($t_1$) to be in a colored state, under a temperature environment not exceeding the decoloring starting temperature ($t_3$), light was irradiated up to 4 hours per hour at an irradiance of 170 w/m² using a xenon light resistance tester (manufactured by Suga Test Instruments Co., Ltd., Table Sun XT75L).

Y color density at the time of coloring and decoloring was measured with a reflection densitometer (manufactured by Konica Minolta, Inc., FD-7), and the difference in density (density at the time of coloring—density at the time of decoloring) was determined.

The density difference at 0 hours of light irradiation was taken as 100%, and a change in density difference at each irradiation time was measured.

The following table shows the results of the light resistance test.

TABLE 4

| | Change rate of density difference [%] | | | | |
|---|---|---|---|---|---|
| | 0 hour | 1 hour | 2 hours | 3 hours | 4 hours |
| Example 101 | 100 | 100 | 100 | 91 | 81 |
| Example 102 | 100 | 94 | 78 | 77 | 64 |
| Example 103 | 100 | 94 | 89 | 79 | 70 |
| Example 104 | 100 | 97 | 90 | 82 | 73 |
| Example 105 | 100 | 91 | 85 | 84 | 75 |
| Example 106 | 100 | 100 | 100 | 100 | 94 |
| Example 107 | 100 | 100 | 92 | 79 | 72 |
| Example 108 | 100 | 92 | 82 | 72 | 63 |
| Example 109 | 100 | 96 | 97 | 95 | 89 |
| Example 110 | 100 | 100 | 100 | 100 | 95 |
| Example 111 | 100 | 100 | 99 | 87 | 72 |
| Comparative Example 101 | 100 | 46 | 35 | 24 | 11 |
| Comparative Example 102 | 100 | 48 | 41 | 33 | 25 |
| Comparative Example 103 | 100 | 54 | 38 | 26 | 16 |
| Comparative Example 104 | 100 | 55 | 38 | 23 | 8 |
| Comparative Example 105 | 100 | 61 | 39 | 21 | 10 |

From the test results, it was found that the reversibly thermochromic composition of the present invention and the microcapsule pigment encapsulating the same both exhibited good light resistance with little attenuation of the difference in density between the colored state and the decolored state due to light irradiation. On the other hand, in any sample using the reversibly thermochromic composition prepared in Comparative Example and the microcapsule pigment encapsulating the same, the attenuation of the difference in density due to light irradiation was large.

Application Example 101

Preparation of Reversibly Thermochromic Display

A reversibly color changeable layer was obtained by carrying out printing on a surface of a white polyester film (thickness: 25 μm) as a support using ink in which the microcapsule pigment prepared in Example 102 was dispersed in a vehicle including a binder resin, and a transparent polyester film having a thickness of 16 μm was further laminated on the top surface of the reversibly color changeable layer to obtain a reversibly thermochromic display.

The display was once cooled to −18° C. or lower, and after the reversibly color changeable layer completely developed an orange color, letters were printed using a thermal transfer printer to form white letters.

The white letters are visible as long as the display is kept in the temperature range of −18° C. to 64° C.

When the display was cooled again to −18° C. or lower, and the reversibly color changeable layer completely developed an orange color, the white letters were not visible, and repeated use could be achieved by forming white letters using a thermal transfer printer.

Application Example 102

Stirring and mixing were carried out in a vehicle composed of 15 parts of the microcapsule pigment prepared in Example 104, 40 parts of a 50% acrylic resin/xylene solution, 20 parts of xylene, 20 parts of methyl isobutyl ketone, and 5 parts of a polyisocyanate-based curing agent to obtain a reversibly thermochromic spray.

A reversibly thermochromic spray paint was spray-coated over the whole body of a white miniature car and dried to provide a reversibly thermochromic layer, and thus to obtain a reversibly thermochromic miniature car.

In the miniature car, the reversibly thermochromic layer developed an orange color at room temperature (25° C.), but turned white when the miniature car was immersed in warm water of 39° C. When taken out of the warm water and allowed to stand at room temperature, the miniature car was turned to an orange color again, and the above phase could be repeated.

Application Example 103

Preparation of Reversibly Thermochromic Mug 30 parts of the microcapsule pigment prepared in Example 105, 60 parts of a hard liquid epoxy resin, 2 parts of an ultraviolet absorber, 2 parts of a thixotropic agent, and 0.5 parts of an antifoaming agent were mixed, and further 40 parts of an aliphatic polyamine of a room temperature curing type was added to obtain a reversibly thermochromic epoxy ink.

Using the reversibly thermochromic epoxy ink, star patterns were printed on a side surface of a ceramic mug with a stainless steel screen plate by a curved surface printing machine, and a reversibly thermochromic layer was provided by heating and curing at 70° C. for 1 hour, thus obtaining a reversibly thermochromic mug.

In the mug, at room temperature (25° C.), the reversibly thermochromic layer develops a yellow color, and the star pattern is visible. However, when hot water of 58° C. is poured, the reversibly thermochromic layer is decolored and turns colorless. When the hot water is removed from this state, or when the water temperature becomes 43° C. or lower, the reversibly thermochromic layer is colored, and the yellow star pattern is visible again.

This phase change could be repeated due to a temperature change.

Application Example 104

Preparation of Ballpoint Pen

A reversibly thermochromic ink composition composed of 20 parts of the microcapsule pigment prepared in Example 107 (which had been cooled to −18° C. or lower to develop an orange color in advance), 0.3 parts of xanthan gum, 10 parts of urea, 10 parts of glycerin, 0.5 parts of a nonionic penetrant imparting agent, 0.1 parts of a modified silicone antifoaming agent, 0.2 parts of a preservative, and 58.9 parts of water was prepared.

A polypropylene pipe was filled by suction with the reversibly thermochromic ink composition and connected, via a holder made of a resin, with a ballpoint pen tip holding a 0.5 mm stainless steel ball on its front end.

Next, an ink follower (liquid plug) containing polybutene as a main component and having viscoelasticity was filled from the rear end of the polyprene pipe, and a tail plug was fitted in the rear portion of the pipe. A front axial barrel and a rear axial barrel were assembled, a cap was fitted thereto, and then degassing treatment was carried out by centrifugation, whereby a ballpoint pen was obtained.

The rear portion of the rear axial barrel has a rubber made of SEBS attached as a frictional body.

Using the ballpoint pen, an orange letter (handwriting) was formed by writing on a sheet of paper.

The handwriting showed orange at room temperature (25° C.), but the letter discolored and became colorless when the letter was rubbed using the frictional body. This state could be maintained as long as the sheet of paper was not cooled to a temperature of −18° C. or lower.

Meanwhile, when the sheet of paper was put in a freezer and cooled to −18° C. or lower, the letter showed a discoloration behavior of turning orange again, and the discoloration behavior was repeatedly reproducible.

Application Example 105

Preparation of Marking Pen

A reversibly thermochromic ink composition was prepared by mixing 25.0 parts of the microcapsule pigment prepared in Example 107 (which had been cooled to −18° C. or lower to develop an orange color in advance) with 0.5 parts of a comb type polymer dispersant [manufactured by Lubrizol Japan Ltd., trade name: SOLSPERSE 43000], 1.0 parts of an organic nitrogen sulfur compound [manufactured by Hokko Chemical Industry Co., Ltd., trade name: HOKU-SIDE R-150, a mixture of 2-methyl-4-isothiazolin-3-one and 5-chloro-2-methyl-4-isothiazolin-3-one], 0.5 parts of polyvinyl alcohol, 35.0 parts of glycerin, 0.02 parts of an antifoaming agent, and 37.98 parts of water.

An ink absorbent prepared by covering a polyester sliver with a synthetic resin film was impregnated with the ink composition and inserted into an axial barrel made of a polypropylene resin. Then, the axial barrel was assembled with a resin-processed pen body (chisel shape) made of polyester fibers via a holder in such a manner that the front end of the axial barrel was in connection with the pen body, and a cap was fitted thereto to obtain a marking pen.

The rear end portion of the axial barrel has an SEBS resin attached as a friction member.

Using the marking pen, an orange letter (handwriting) was formed by writing on a sheet of paper.

The handwriting showed orange at room temperature (25° C.), but the letter discolored and became colorless when the letter was rubbed using the frictional body. This state could be maintained as long as the sheet of paper was not cooled to a temperature of −18° C. or lower.

Meanwhile, when the sheet of paper was put in a freezer and cooled to −18° C. or lower, the letter showed a discoloration behavior of turning orange again, and the discoloration behavior was repeatedly reproducible.

Next, an example including the pyridine derivative represented by the formula (2) as the component (a) is shown.

Example 201

Preparation of Reversibly Thermochromic Composition

A reversibly thermochromic composition changing from fluorescent yellow color to colorless was obtained by mixing 1 part of 2,6-bis(2-ethyloxyphenyl)-4-(4-(2,4,6-trimethylphenyl)aminophenyl)pyridine as the component (a), 5 parts of 1,1-bis(4'-hydroxyphenyl)n-decane and 4 parts of 2,2-bis(4'-hydroxyphenyl)hexafluoropropane as the component (b), and 25 parts of myristyl alcohol and 25 parts of butyl stearate as the component (c), followed by heating to dissolve them.

The complete coloration temperature ($t_1$) of the reversibly thermochromic composition was 10° C., the coloring starting temperature ($t_2$) was 12° C., the decoloring starting temperature ($t_3$) was 11° C., the complete decoloring temperature ($t_4$) was 15° C., and the hysteresis width ($\Delta H$) was 2° C.

Examples 202 to 207

Preparation of Microcapsule Pigment

A reversibly thermochromic composition was prepared by the same method as Example 1 using the components (a), (b) and (c) shown in the following table, and a microcapsule pigment suspension encapsulated in a microcapsule was obtained by interfacial polymerization.

The resulting microcapsule pigment suspension was subjected to centrifugation to isolate a pigment, and thus to obtain a microcapsule pigment having an average particle size of 2 μm.

Bracketed numbering in the table indicates parts by mass.

alcohol and 25 parts of butyl stearate as the component (c), followed by heating to dissolve them.

The complete coloration temperature ($t_1$) of the reversibly thermochromic composition was 6° C., the coloring starting temperature ($t_2$) was 11° C., the decoloring starting temperature ($t_3$) was 9° C., the complete decoloring temperature ($t_4$) was 14° C., and the hysteresis width ($\Delta H$) was 3° C.

Comparative Examples 202 to 205

Preparation of Microcapsule Pigment

A reversibly thermochromic composition was prepared by the same method as Comparative Example 201 using the

TABLE 5

| Example | Component (a) | Component (b) | Component (c) | Color change |
|---|---|---|---|---|
| 202 | 2,6-bis(2,4-diethyloxyphenyl)-4-(4-phenylaminophenyl)pyridine (1) | 2,2-bis(4'-hydroxyphenyl)hexafluoropropane (8) | 4-benzyloxyphenylethyl caprylate (50) | Fluorescent yellow ↕ Colorless |
| 203 | 2,6-bis(2,4-diethyloxyphenyl)-4-(4-(4-methylphenyl)aminophenyl)pyridine (1) | bis(4-hydroxyphenyl)sulfide (8) | Neopentylstearate (50) | Fluorescent yellow ↕ Colorless |
| 204 | 2,6-bis(2,4-diethyloxyphenyl)-4-(4-(2,4-dimethylphenyl)aminophenyl)pyridine (1) | laurylgallate (8) | Octadecyl decanoate (50) | Fluorescent yellow ↕ Colorless |
| 205 | 2,6-bis(2,4-diethyloxyphenyl)-4-(4-(2,4,6-trimethylphenyl)aminophenyl)pyridine (1) | 2,2'-methylenebis(4-chlorophenol) (8) | Stearylstearate (50) | Fluorescent yellow ↕ Colorless |
| 206 | 2,6-bis(4-chloro-2-ethyloxyphenyl)-4-(4-(4-methylphenyl)aminophenyl)pyridine (1) | 1,1-bis(4'-hydroxyphenyl)n-decane (8) | 9-Heptadecanone (25) Cetylalcohol (25) | Fluorescent orange ↕ Colorless |
| 207 | 2,6-bis(4-chloro-2-ethyloxyphenyl)-4-(4-(2,4,6-trimethylphenyl)aminophenyl)pyridine (1) | 2,2-bis(4'-hydroxyphenyl)hexafluoropropane (8) | 4-benzyloxyphenylethyl caprylate (50) | Fluorescent yellow ↕ Colorless |

Comparative Example 201

Preparation of Reversibly Thermochromic Composition

A reversibly thermochromic composition changing from fluorescent orange color to colorless was obtained by mixing 1 part of 2,6-diphenyl-4-(4'-dimethylaminophenyl)-pyridine as the component (a), 4 parts of 1,1-bis(4'-hydroxyphenyl) n-decane and 4 parts of 2,2-bis(4'-hydroxyphenyl)hexafluoropropane as the component (b), and 25 parts of myristyl components (a), (b) and (c) shown in the following table, and a microcapsule pigment suspension encapsulated in a microcapsule was obtained by interfacial polymerization.

The resulting microcapsule pigment suspension was subjected to centrifugation to isolate a pigment, and thus to obtain a microcapsule pigment having an average particle size of 2 μm.

Bracketed numbering in the table indicates parts by mass.

TABLE 6

| Comparative Example | Component (a) | Component (b) | Component (c) | Color change |
|---|---|---|---|---|
| 202 | 2,6-bis(4-dimethylaminophenyl)-4-phenylpyridine (1) | 2,2-bis(4'-hydroxyphenyl)hexafluoropropane (8) | 4-benzyloxyphenylethyl caprylate | Fluorescent orange ↕ Colorless |
| 203 | 2-(4-dimethylaminophenyl)-4-methoxyquinazolin (1) | bis(4-hydroxyphenyl)sulfide (8) | Neopentylstearate (50) | Fluorescent yellow ↕ Colorless |
| 204 | 4,4'-(ethylenedioxy)-bis(2-(4-dimethylaminophenyl)quinazoline) (1) | laurylgallate (8) | Octadecyldecanoate (50) | Fluorescent yellow ↕ Colorless |

TABLE 6-continued

| Comparative Example | Component (a) | Component (b) | Component (c) | Color change |
|---|---|---|---|---|
| 205 | 4-(4-dimethylaminophenyl)-2-(2-octyloxyphenyl)-6-phenylpyridine (1) | 2,2'-methylenebis(4-chlorophenol) (8) | Stearylstearate (50) | Fluorescent yellow ↕ Colorless |

Preparation of Measuring Sample

The reversibly thermochromic compositions of Example 201 and Comparative Example 201 were uniformly heated and melted, and then impregnated into filter paper (made by Toyo Filter Paper Co., Ltd. No. 2 filter paper) to obtain a measurement sample.

A thermochromic color-memory ink was prepared by uniformly dispersing 40 parts of the microcapsule pigments of Examples 202 to 207 and Comparative Examples 202 to 205 in an aqueous ink vehicle composed of 50 parts of an ethylene-vinyl acetate resin emulsion, 1 part of a leveling agent, 1 part of an antifoaming agent, 0.5 parts of a viscosity regulator, and 7.5 parts of water.

A measuring sample was obtained by screen-printing a solid pattern on a high-quality paper by using the ink.

Measurement of Hysteresis Characteristics

The measuring sample was placed in the measurement portion of the colorimeter (TC-3600 type colorimeter, manufactured by Tokyo Denshoku, Co., Ltd.), temperature of the sample portion was increasing or decreasing at a speed of 2° C./min to measure a brightness value as color density at each temperature, to thereby plot a color density-temperature curve. From the color density-temperature curve, $t_1$, $t_2$, $t_3$, $t_4$, and $\Delta H$ (hysteresis width: temperature at a midpoint between $t_3$ and $t_4$—temperature at a midpoint between $t_1$ and $t_2$) were determined.

The following table shows the test results.

TABLE 7

|  | Complete coloration temperature $t_1$ (° C.) | Coloring starting temperature $t_2$ (° C.) | Decoloring starting temperature $t_3$ (° C.) | Complete decoloring temperature $t_4$ (° C.) | $\Delta H$ |
|---|---|---|---|---|---|
| Example 202 | −18 | −8 | 48 | 63 | 68.5 |
| Example 203 | 12 | 14 | 28 | 32 | 17 |
| Example 204 | 26 | 31 | 30 | 39 | 6 |
| Example 205 | 43 | 50 | 44 | 58 | 4.5 |
| Example 206 | 28 | 30 | 32 | 35 | 4.5 |
| Example 207 | −16 | −5 | 50 | 62 | 66.5 |
| Comparative Example 202 | −17 | −5 | 45 | 63 | 65 |
| Comparative Example 203 | 13 | 15 | 28 | 32 | 16 |
| Comparative Example 204 | 26 | 31 | 34 | 39 | 8 |
| Comparative Example 205 | 43 | 50 | 47 | 58 | 6 |

Light Resistance Test

After each measurement sample was cooled to below the complete coloring temperature ($t_1$) to be in a colored state, under a temperature environment not exceeding the decoloring starting temperature ($t_3$), light was irradiated up to 4 hours per hour at an irradiance of 170 w/m² using a xenon light resistance tester (manufactured by Suga Test Instruments Co., Ltd., Table San XT75L).

Y color density at the time of coloring and decoloring was measured with a reflection densitometer (manufactured by Konica Minolta, Inc., FD-7), and the difference in density (density at the time of coloring—density at the time of decoloring) was determined.

The density difference at 0 hours of light irradiation was taken as 100%, and a change in density difference at each irradiation time was measured.

The following table shows the results of the light resistance test.

TABLE 8

|  | Change rate of density difference [%] | | | | |
|---|---|---|---|---|---|
|  | 0 hour | 1 hour | 2 hours | 3 hours | 4 hours |
| Example 201 | 100 | 97 | 92 | 90 | 83 |
| Example 202 | 100 | 95 | 91 | 84 | 78 |
| Example 203 | 100 | 94 | 84 | 78 | 71 |
| Example 204 | 100 | 95 | 90 | 80 | 71 |
| Example 205 | 100 | 99 | 96 | 89 | 82 |
| Example 206 | 100 | 100 | 99 | 97 | 95 |
| Example 207 | 100 | 84 | 74 | 74 | 72 |
| Comparative Example 201 | 100 | 58 | 43 | 31 | 20 |
| Comparative Example 202 | 100 | 48 | 41 | 33 | 25 |
| Comparative Example 203 | 100 | 54 | 38 | 26 | 16 |
| Comparative Example 204 | 100 | 55 | 38 | 23 | 8 |
| Comparative Example 205 | 100 | 55 | 39 | 24 | 13 |

From the test results, it was found that the reversibly thermochromic composition of the present invention and the microcapsule pigment encapsulating the same both exhibited good light resistance with little attenuation of the difference in density between the colored state and the decolored state due to light irradiation. On the other hand, in any sample using the reversibly thermochromic composition prepared in Comparative Example and the microcapsule pigment encapsulating the same, the attenuation of the difference in density due to light irradiation was large.

Application Example 201

Preparation of Reversibly Thermochromic Display

A reversibly color changeable layer was obtained by carrying out printing on a surface of a white polyester film (thickness: 25 μm) as a support using ink in which the microcapsule pigment prepared in Example 202 was dispersed in a vehicle including a binder resin, and a transparent polyester film having a thickness of 16 μm was further laminated on the top surface of the reversibly color changeable layer to obtain a reversibly thermochromic display.

The display was once cooled to −18° C. or lower, and after the reversibly color changeable layer completely developed a yellow color, letters were printed using a thermal transfer printer to form white letters.

The white letters are visible as long as the display is kept in the temperature range of −18° C. to 63° C.

When the display was cooled again to −18° C. or lower, and the reversibly color changeable layer completely developed a yellow color, the white letters were not visible, and repeated use could be achieved by forming white letters using a thermal transfer printer.

Application Example 202

Stirring and mixing were carried out in a vehicle composed of 15 parts of the microcapsule pigment prepared in Example 204, 40 parts of a 50% acrylic resin/xylene solution, 20 parts of xylene, 20 parts of methyl isobutyl ketone, and 5 parts of a polyisocyanate-based curing agent to obtain a reversibly thermochromic spray.

A reversibly thermochromic spray paint was spray-coated over the whole body of a white miniature car and dried to provide a reversibly thermochromic layer, and thus to obtain a reversibly thermochromic miniature car.

In the miniature car, the reversibly thermochromic layer developed a yellow color at room temperature (25° C.), but turned white when the miniature car was immersed in warm water of 39° C. When taken out of the warm water and allowed to stand at room temperature, the miniature car was turned to a yellow color again, and the above phase could be repeated.

Application Example 203

Preparation of Reversibly Thermochromic Mug 30 parts of the microcapsule pigment prepared in Example 205, 60 parts of a hard liquid epoxy resin, 2 parts of an ultraviolet absorber, 2 parts of a thixotropic agent, and 0.5 parts of an antifoaming agent were mixed, and further 40 parts of an aliphatic polyamine of a room temperature curing type was added to obtain a reversibly thermochromic epoxy ink.

Using the reversibly thermochromic epoxy ink, star patterns were printed on a side surface of a ceramic mug with a stainless steel screen plate by a curved surface printing machine, and a reversibly thermochromic layer was provided by heating and curing at 70° C. for 1 hour, thus obtaining a reversibly thermochromic mug.

In the mug, at room temperature (25° C.), the reversibly thermochromic layer develops a yellow color, and the star pattern is visible. However, when hot water of 58° C. is poured, the reversibly thermochromic layer is decolored and turns colorless. When the hot water is removed from this state, or when the water temperature becomes 43° C. or lower, the reversibly thermochromic layer is colored, and the yellow star pattern is visible again.

This phase change could be repeated due to a temperature change.

Application Example 204

Preparation of Ballpoint Pen

A reversibly thermochromic ink composition composed of 20 parts of the microcapsule pigment prepared in Example 207 (which had been cooled to −16° C. or lower to develop a yellow color in advance), 0.3 parts of xanthan gum, 10 parts of urea, 10 parts of glycerin, 0.5 parts of a nonionic penetrant imparting agent, 0.1 parts of a modified silicone antifoaming agent, 0.2 parts of a preservative, and 58.9 parts of water was prepared.

A polypropylene pipe was filled by suction with the reversibly thermochromic ink composition and connected, via a holder made of a resin, with a ballpoint pen tip holding a 0.5 mm stainless steel ball on its front end.

Next, an ink follower (liquid plug) containing polybutene as a main component and having viscoelasticity was filled from the rear end of the polyprene pipe, and a tail plug was fitted in the rear portion of the pipe. A front axial barrel and a rear axial barrel were assembled, a cap was fitted thereto, and then degassing treatment was carried out by centrifugation, whereby a ballpoint pen was obtained.

The rear portion of the rear axial barrel has a rubber made of SEBS attached as a frictional body.

Using the ballpoint pen, a yellow letter (handwriting) was formed by writing on a sheet of paper.

The handwriting showed yellow at room temperature (25° C.), but the letter discolored and became colorless when the letter was rubbed using the frictional body. This state could be maintained as long as the sheet of paper was not cooled to a temperature of −16° C. or lower.

Meanwhile, when the sheet of paper was put in a freezer and cooled to −16° C. or lower, the letter showed a discoloration behavior of turning yellow again, and the discoloration behavior was repeatedly reproducible.

Application Example 205

Preparation of Marking Pen

A reversibly thermochromic ink composition was prepared by mixing 25.0 parts of the microcapsule pigment prepared in Example 207 (which had been cooled to −18° C. or lower to develop a yellow color in advance) with 0.5 parts of a comb type polymer dispersant [manufactured by Lubrizol Japan Ltd., trade name: SOLSPERSE 43000], 1.0 parts of an organic nitrogen sulfur compound [manufactured by Hokko Chemical Industry Co., Ltd., trade name: HOKUSIDE R-150, a mixture of 2-methyl-4-isothiazolin-3-one and 5-chloro-2-methyl-4-isothiazolin-3-one], 0.5 parts of polyvinyl alcohol, 35.0 parts of glycerin, 0.02 parts of an antifoaming agent, and 37.98 parts of water.

An ink absorbent prepared by covering a polyester sliver with a synthetic resin film was impregnated with the ink composition and inserted into an axial barrel made of a polypropylene resin. Then, the axial barrel was assembled with a resin-processed pen body (chisel shape) made of polyester fibers via a holder in such a manner that the front end of the axial barrel was in connection with the pen body, and a cap was fitted thereto to obtain a marking pen.

The rear end portion of the axial barrel has an SEBS resin attached as a friction member.

Using the marking pen, a yellow letter (handwriting) was formed by writing on a sheet of paper.

The handwriting showed orange at room temperature (25° C.), but the letter discolored and became colorless when the letter was rubbed using the frictional body. This state could be maintained as long as the sheet of paper was not cooled to a temperature of −16° C. or lower.

Meanwhile, when the sheet of paper was put in a freezer and cooled to −16° C. or lower, the letter showed a discoloration behavior of turning yellow again, and the discoloration behavior was repeatedly reproducible.

REFERENCE SIGNS LIST $t_1$ complete coloring temperature
$t_2$ coloring starting temperature
$t_3$ decoloring starting temperature $t_4$ complete decoloring temperature
$T_1$ complete decoloring temperature
$T_2$ decoloring starting temperature
$T_3$ coloring starting temperature
$T_4$ complete coloring temperature
$\Delta H$ hysteresis width

The invention claimed is:

1. A reversibly thermochromic composition comprising:
(a) a pyridine derivative represented by the following formula (A), as an electron-donating color-developing organic compound;
(b) an electron-accepting compound; and
(c) a reaction medium which reversibly induces an electron transfer reaction between the component (a) and the component (b) in a specific temperature range:

[Chem. 1]

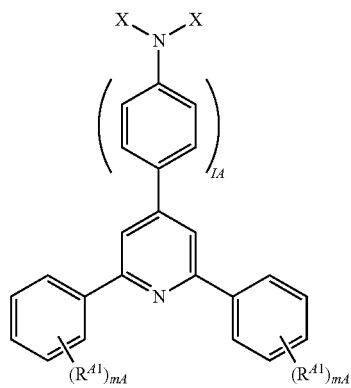

(A)

(wherein,
each $R^{A1}$ is independently hydrogen, a halogen group, or a linear or branched alkoxy group having 1 to 6 carbon atoms, provided that at least one of $R^{A1}$ is an alkoxy group,
each mA is independently an integer of 1 to 3,
lA is an integer of 1 or 2, and
X is hydrogen or a group represented by the following formula:

[Chem. 2]

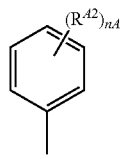

wherein, each $R^{A2}$ is independently hydrogen, a linear or branched alkyl group having 1 to 6 carbon atoms, or a linear or branched alkoxy group having 1 to 6 carbon atoms, and
each nA is independently an integer of 1 to 3,
provided that two X never simultaneously form hydrogen and never simultaneously form a phenyl group).

2. The composition according to claim 1, wherein the component (a) is a pyridine derivative represented by the following formula (1) or (2):

[Chem. 3]

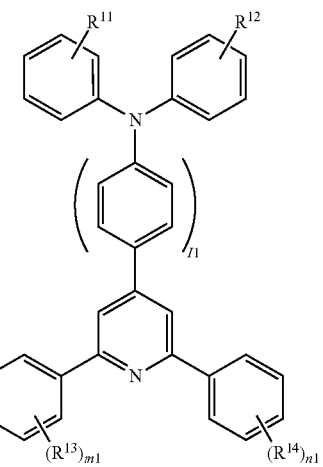

(1)

(wherein
$R^{11}$ is a linear or branched alkyl group having 1 to 6 carbon atoms, or a linear or branched alkoxy group having 1 to 6 carbon atoms,
$R^{12}$ is hydrogen, a linear or branched alkyl group having 1 to 6 carbon atoms, or a linear or branched alkoxy group having 1 to 6 carbon atoms,
each $R^{13}$ is independently a halogen group or a linear or branched alkoxy group having 1 to 6 carbon atoms, provided that at least one of $R^{13}$ is an alkoxy group,
each $R^{14}$ is independently hydrogen, a halogen group, or a linear or branched alkoxy group having 1 to 6 carbon atoms,
l1 is an integer of 1 or 2, and
m1 and n1 each independently represents an integer of 1 to 3),

[Chem. 4]

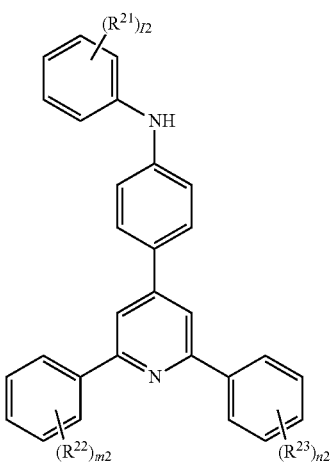

(2)

(wherein
each $R^{21}$ is independently a linear or branched alkyl group having 1 to 6 carbon atoms, or a linear or branched alkoxy group having 1 to 6 carbon atoms,
each $R^{22}$ is independently a halogen group or a linear or branched alkoxy group having 1 to 6 carbon atoms, provided that at least one of $R^{22}$ is an alkoxy group, each $R^{23}$ is independently hydrogen, a halogen group, or a linear or branched alkoxy group having 1 to 6 carbon atoms, l2 is an integer of 0 to 3, and m2 and n2 represent an integer of 1 to 3).

3. The composition according to claim 2, wherein in the pyridine derivative represented by the formula (1), $R^{11}$ is a linear or branched alkyl group having 1 to 6 carbon atoms, $R^{12}$ is hydrogen or a linear or branched alkyl group having 1 to 6 carbon atoms, each $R^{13}$ is independently a halogen group or a linear or branched alkoxy group having 1 to 6 carbon atoms, provided that at least one of $R^{13}$ is an alkoxy group, and l1 is 1.

4. The composition according to claim 2, wherein in the pyridine derivative represented by the formula (1), $R^{11}$ is a linear or branched alkyl group having 1 to 4 carbon atoms, $R^{12}$ is hydrogen, or a linear or branched alkyl group having 1 to 4 carbon atoms, each $R^{13}$ is independently a halogen group or a linear or branched alkoxy group having 1 to 4 carbon atoms, provided that at least one of $R^{13}$ is an alkoxy group, $R^{14}$ is hydrogen, a halogen group, or a linear or branched alkoxy group having 1 to 4 carbon atoms, l1 is 1, and m1 and n1 are integers of 1 to 2.

5. The composition according to claim 2, wherein in the pyridine derivative represented by the formula (2), each $R^{21}$ is independently a linear or branched alkyl group having 1 to 6 carbon atoms, and each $R^{22}$ is independently a halogen group or a linear or branched alkoxy group having 1 to 6 carbon atoms, provided that at least one of $R^{22}$ is an alkoxy group.

6. The composition according to claim 2, wherein in the pyridine derivative represented by the formula (2), each $R^{21}$ is independently a linear or branched alkyl group having 1 to 4 carbon atoms, each $R^{22}$ is independently a halogen group or a linear or branched alkoxy group having 1 to 4 carbon atoms, provided that at least one of $R^{22}$ is an alkoxy group, and each $R^{23}$ is independently hydrogen, a halogen group, or a linear or branched alkoxy group having 1 to 4 carbon atoms.

7. The composition according to claim 1, wherein composition ratios of the component (b) and the component (c) with respect to 1 part of the component (a) are 0.1 to 100 parts and 5 to 200 parts, respectively, on mass basis.

8. A reversibly thermochromic microcapsule pigment encapsulating the reversibly thermochromic composition according to claim 1.

9. A reversibly thermochromic liquid composition comprising the reversibly thermochromic microcapsule pigment according to claim 8 and a vehicle.

10. A resin composition for forming a reversibly thermochromic molded article comprising the reversibly thermochromic microcapsule pigment according to claim 8, and a thermoplastic resin, a thermosetting resin, or wax.

11. A laminate comprising a reversibly thermochromic layer comprising the reversibly thermochromic compositions according to claim 1 on a support.

* * * * *